(12) United States Patent
Hazenberg et al.

(10) Patent No.: US 12,070,097 B2
(45) Date of Patent: Aug. 27, 2024

(54) ARTICLE OF FOOTWEAR INCORPORATING FOAM-FILLED ELEMENTS AND METHODS FOR MANUFACTURING THE FOAM-FILLED ELEMENTS

(71) Applicant: NIKE, Inc., Beaverton, OR (US)

(72) Inventors: Klaas P. Hazenberg, Guangzhou (CN); Eric S. Schindler, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 977 days.

(21) Appl. No.: 16/793,183

(22) Filed: Feb. 18, 2020

(65) Prior Publication Data

US 2020/0178645 A1 Jun. 11, 2020

Related U.S. Application Data

(60) Division of application No. 15/953,979, filed on Apr. 16, 2018, now abandoned, which is a continuation of
(Continued)

(51) Int. Cl.
*B29C 65/02* (2006.01)
*A43B 1/00* (2006.01)
(Continued)

(52) U.S. Cl.
CPC .......... *A43B 13/184* (2013.01); *A43B 1/0009* (2013.01); *A43B 7/148* (2013.01);
(Continued)

(58) Field of Classification Search
None
See application file for complete search history.

(56) References Cited

U.S. PATENT DOCUMENTS 288,027 A 11/1883 Ceaxe
294,537 A 3/1884 Waring
(Continued)

FOREIGN PATENT DOCUMENTS

EP 0130816 A2 1/1985
EP 0687425 A1 12/1995
(Continued)

OTHER PUBLICATIONS

International Searching Authority, International Search Report and Written Opinion in PCT Application No. PCT/US2008/066970, mailed Jan. 19, 2009.
(Continued)

*Primary Examiner* — Christopher T Schatz
(74) *Attorney, Agent, or Firm* — Honigman LLP; Matthew H. Szalach; Jonathan P. O'Brien

(57) ABSTRACT

An article of footwear may have an upper and a sole structure secured to the upper. The sole structure has a plurality of support elements, and each of the support elements include a shell and a core. The shell defines an interior void and is formed from a polymer material that extends around substantially all of the void. The core has a shape of the void and is located within the void, with at least a portion of the core being a polymer foam material. The polymer foam material of at least two of the support elements may have different densities.

7 Claims, 32 Drawing Sheets

Related U.S. Application Data application No. 15/187,551, filed on Jun. 20, 2016, now Pat. No. 9,955,751, which is a continuation of application No. 14/107,222, filed on Dec. 16, 2013, now Pat. No. 9,392,845, which is a continuation of application No. 13/029,935, filed on Feb. 17, 2011, now Pat. No. 8,613,122, which is a division of application No. 11/777,787, filed on Jul. 13, 2007, now Pat. No. 7,941,941.

(51) Int. Cl.

| | | |
|---|---|---|
| A43B 7/148 | (2022.01) | |
| A43B 13/02 | (2022.01) | |
| A43B 13/04 | (2006.01) | |
| A43B 13/12 | (2006.01) | |
| A43B 13/14 | (2006.01) | |
| A43B 13/16 | (2006.01) | |
| A43B 13/18 | (2006.01) | |
| A43B 13/22 | (2006.01) | |
| A43B 23/02 | (2006.01) | |
| A43D 8/00 | (2006.01) | |
| A43D 86/00 | (2006.01) | |
| B29C 43/36 | (2006.01) | |
| B29C 44/04 | (2006.01) | |
| B29C 44/34 | (2006.01) | |
| B29D 35/12 | (2010.01) | |
| B29D 35/14 | (2010.01) | |

(52) U.S. Cl.
CPC ............. *A43B 13/02* (2013.01); *A43B 13/04* (2013.01); *A43B 13/12* (2013.01); *A43B 13/122* (2013.01); *A43B 13/141* (2013.01); *A43B 13/16* (2013.01); *A43B 13/18* (2013.01); *A43B 13/187* (2013.01); *A43B 13/188* (2013.01); *A43B 13/223* (2013.01); *A43B 23/021* (2013.01); *A43D 8/00* (2013.01); *A43D 86/00* (2013.01); *B29C 43/36* (2013.01); *B29C 44/0415* (2013.01); *B29C 44/351* (2013.01); *B29C 65/02* (2013.01); *B29D 35/122* (2013.01); *B29D 35/142* (2013.01)

(56) References Cited

U.S. PATENT DOCUMENTS

| | | |
|---|---|---|
| 294,653 A | 3/1884 | Melville |
| 378,472 A | 2/1888 | Stephanson |
| 421,832 A | 2/1890 | Green |
| 500,385 A | 6/1893 | Hall |
| 2,155,166 A | 4/1939 | Kraft |
| 2,188,168 A | 1/1940 | Mabel |
| 2,224,590 A | 12/1940 | Odilon |
| 2,627,676 A | 2/1953 | Hack |
| 2,744,340 A | 5/1956 | Gerber |
| 3,087,261 A | 4/1963 | Russell |
| 3,087,262 A | 4/1963 | Russell |
| 3,253,355 A | 5/1966 | Menken |
| 3,800,016 A | 3/1974 | Roberts |
| 3,984,926 A | 10/1976 | Calderon |
| 4,025,974 A | 5/1977 | Lea et al. |
| 4,059,910 A | 11/1977 | Bryden et al. |
| 4,130,947 A | 12/1978 | Denu |
| 4,138,156 A | 2/1979 | Bonner |
| 4,151,661 A | 5/1979 | Namba et al. |
| 4,219,945 A | 9/1980 | Rudy |
| 4,241,524 A | 12/1980 | Sink |
| 4,265,032 A | 5/1981 | Levine |
| 4,302,892 A | 12/1981 | Adamik |
| 4,309,831 A | 1/1982 | Pritt |
| 4,309,832 A | 1/1982 | Hunt |
| 4,513,449 A | 4/1985 | Donzis |
| 4,588,629 A | 5/1986 | Taylor |
| 4,616,431 A | 10/1986 | Dassler |
| 4,619,055 A | 10/1986 | Davidson |
| 4,638,577 A | 1/1987 | Riggs |
| D288,027 S | 2/1987 | Tonkel |
| 4,874,640 A | 10/1989 | Donzis |
| 4,906,502 A | 3/1990 | Rudy |
| 4,908,964 A | 3/1990 | Deem |
| 4,910,886 A | 3/1990 | Sullivan et al. |
| 5,083,361 A | 1/1992 | Rudy |
| 5,092,060 A | 3/1992 | Frachey et al. |
| 5,134,790 A | 8/1992 | Woitschaetzke et al. |
| 5,193,240 A | 3/1993 | Salpietro |
| 5,367,791 A | 11/1994 | Gross et al. |
| 5,369,896 A | 12/1994 | Frachey et al. |
| 5,543,194 A | 8/1996 | Rudy |
| 5,630,237 A | 5/1997 | Ku |
| 5,713,140 A | 2/1998 | Baggenstoss |
| 5,741,568 A | 4/1998 | Rudy |
| 5,784,808 A | 7/1998 | Hockerson |
| 5,827,459 A | 10/1998 | Allen et al. |
| 5,915,820 A | 6/1999 | Kraeuter et al. |
| 5,918,383 A | 7/1999 | Chee |
| 5,926,974 A | 7/1999 | Friton |
| 5,987,781 A | 11/1999 | Pavesi et al. |
| 5,993,585 A | 11/1999 | Goodwin et al. |
| 5,996,253 A | 12/1999 | Spector |
| 6,018,889 A | 2/2000 | Friton |
| 6,041,521 A | 3/2000 | Wong |
| 6,065,230 A | 5/2000 | James |
| 6,079,126 A | 6/2000 | Olszewski |
| 6,115,945 A | 9/2000 | Ellis, III |
| 6,119,371 A | 9/2000 | Goodwin et al. |
| 6,127,010 A | 10/2000 | Rudy |
| 6,226,896 B1 | 5/2001 | Friton |
| 6,266,896 B1 | 7/2001 | Liu |
| 6,487,795 B1 | 12/2002 | Ellis, III |
| 6,516,540 B2 | 2/2003 | Seydel et al. |
| 6,883,253 B2 | 4/2005 | Smith et al. |
| 6,898,870 B1 | 5/2005 | Rohde |
| 6,915,594 B2 | 7/2005 | Kim |
| 7,128,796 B2 | 10/2006 | Hensley et al. |
| 7,131,218 B2 | 11/2006 | Schindler |
| 7,313,875 B2 | 1/2008 | Morgan |
| 7,430,817 B2 | 10/2008 | Abadjian et al. |
| 7,437,835 B2 | 10/2008 | Marvin et al. |
| 7,523,566 B2 | 4/2009 | Young-Chul |
| 7,665,231 B2 | 2/2010 | Abadjian et al. |
| 7,752,772 B2 | 7/2010 | Hatfield et al. |
| 7,941,941 B2 | 5/2011 | Hazenberg et al. |
| 8,141,272 B2 | 3/2012 | Hay et al. |
| 8,186,078 B2 | 5/2012 | Avar et al. |
| 8,613,122 B2 | 12/2013 | Hazenberg et al. |
| 9,392,845 B2 | 7/2016 | Hazenberg et al. |
| 2002/0092201 A1 | 7/2002 | Kraeuter et al. |
| 2002/0121031 A1 | 9/2002 | Smith et al. |
| 2003/0046830 A1 | 3/2003 | Ellis |
| 2005/0016023 A1* | 1/2005 | Burris ............... B29D 35/146 36/55 |
| 2005/0039346 A1 | 2/2005 | Thomas et al. |
| 2005/0097777 A1 | 5/2005 | Goodwin |
| 2005/0183287 A1 | 8/2005 | Schindler |
| 2006/0123662 A1 | 6/2006 | Kang |
| 2006/0130368 A1 | 6/2006 | Morgan |
| 2006/0179683 A1 | 8/2006 | Weiss et al. |
| 2007/0094896 A1 | 5/2007 | Hatfield et al. |
| 2007/0205535 A1* | 9/2007 | Vitulli ............... A43B 1/0072 264/250 |
| 2007/0277401 A1 | 12/2007 | Young-Chul |
| 2008/0201992 A1 | 8/2008 | Avar et al. |
| 2008/0229617 A1 | 9/2008 | Johnson et al. |
| 2008/0313932 A1 | 12/2008 | Langvin |
| 2009/0013558 A1 | 1/2009 | Hazenberg et al. |
| 2009/0044432 A1 | 2/2009 | O'Connor et al. |
| 2010/0192420 A1 | 8/2010 | Favraud |
| 2011/0047720 A1 | 3/2011 | Maranan et al. |

(56) References Cited

U.S. PATENT DOCUMENTS

| | | |
|---|---|---|
| 2011/0283560 A1 | 11/2011 | Portzline et al. |
| 2014/0223673 A1* | 8/2014 | Wardlaw ................ B29C 43/18 |
| | | 12/146 B |

FOREIGN PATENT DOCUMENTS

| | | |
|---|---|---|
| EP | 0974281 A2 | 1/2000 |
| FR | 2090352 A1 | 1/1972 |
| WO | WO-199703582 A1 | 2/1997 |
| WO | WO-2004028285 A1 | 4/2004 |
| WO | WO-2007092091 A2 | 8/2007 |

OTHER PUBLICATIONS

State Intellectual Property Office, Office Action in Chinese Invention Patent Application No. 200880004477.6, mailed Dec. 22, 2011.
European Patent Office, Communication Pursuant to Article 94(3) EPC in EP Application No. EP08771063.8, mailed Jun. 8, 2012.
State Intellectual Property Office, Office Action in Chinese Patent Application No. 201110162072.2, mailed Jun. 7, 2013.
State Intellectual Property Office, Office Action in Chinese Patent Application No. 201110162072.2, mailed Oct. 22, 2013.
State Intellectual Property Office, Office Action in Chinese Invention Patent Application No. 200880004477.6, mailed Sep. 25, 2012.
USPTO, Non-Final Office Action for U.S. Appl. No. 11/777,787 mailed Sep. 7, 2010.
USPTO, Non-Final Office Action for U.S. Appl. No. 14/107,222 mailed Nov. 30, 2015.
USPTO, Non-Final Office Action for U.S. Appl. No. 15/187,551 mailed Aug. 30, 2017.
European Patent Office, Extended European Search Report for EP Application No. 18194774.8, mailed Dec. 17, 2018.
United States Patent and Trademark Office, Office Action for U.S. Appl. No. 15/953,979, mailed Aug. 5, 2019.
United States Patent and Trademark Office, Office Action for U.S. Appl. No. 15/953,979, mailed Nov. 19, 2019.

\* cited by examiner

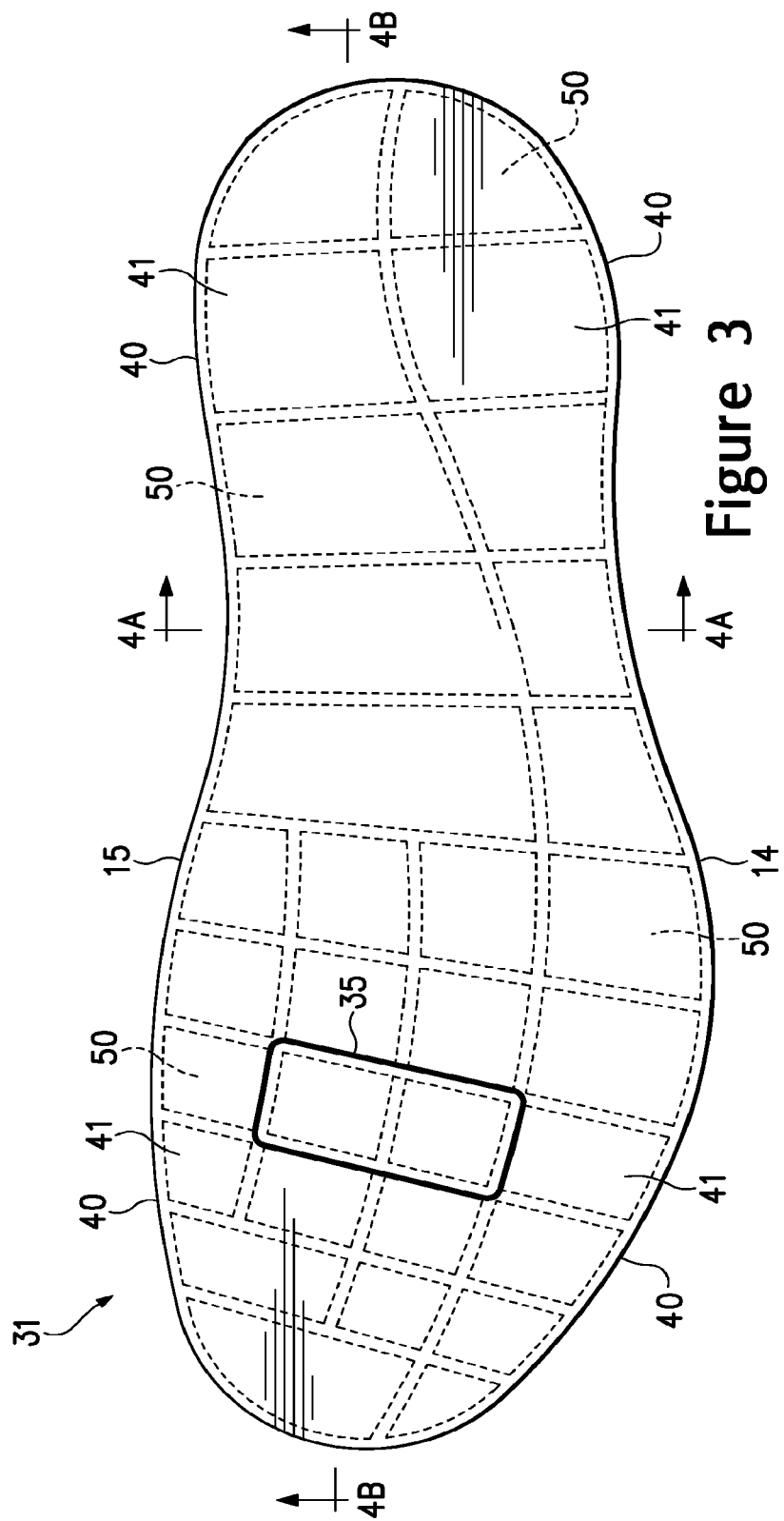

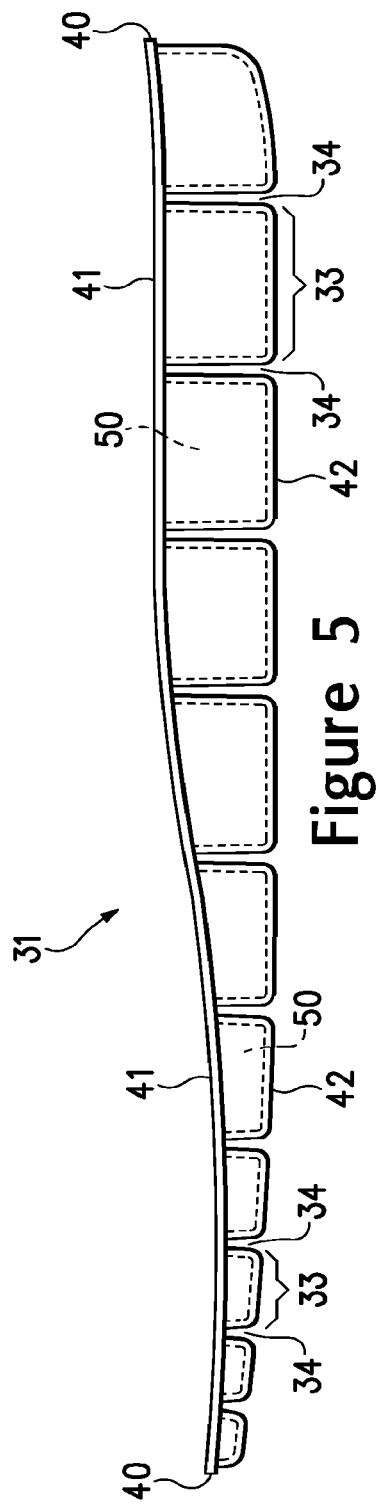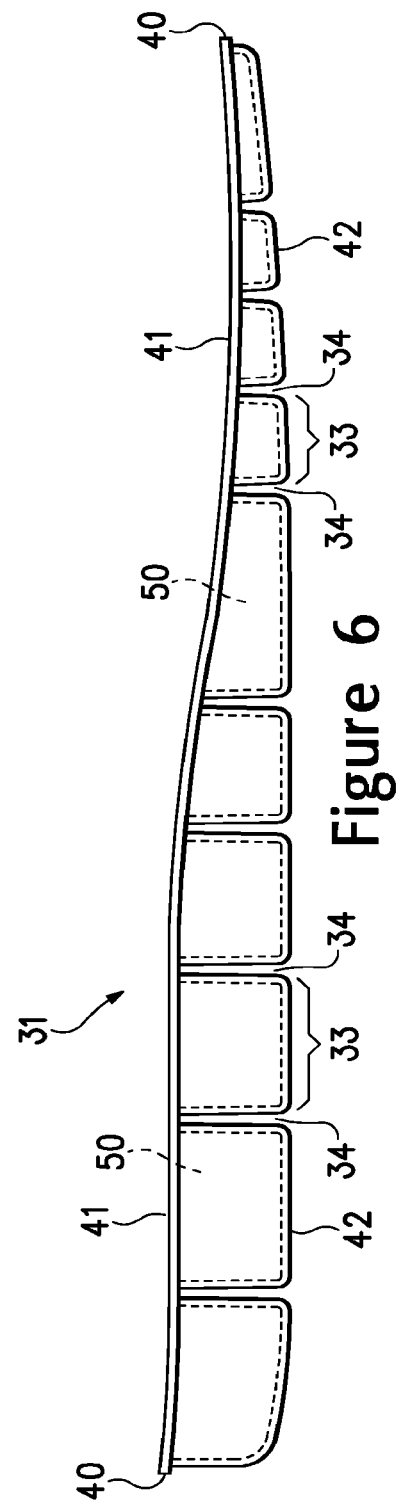

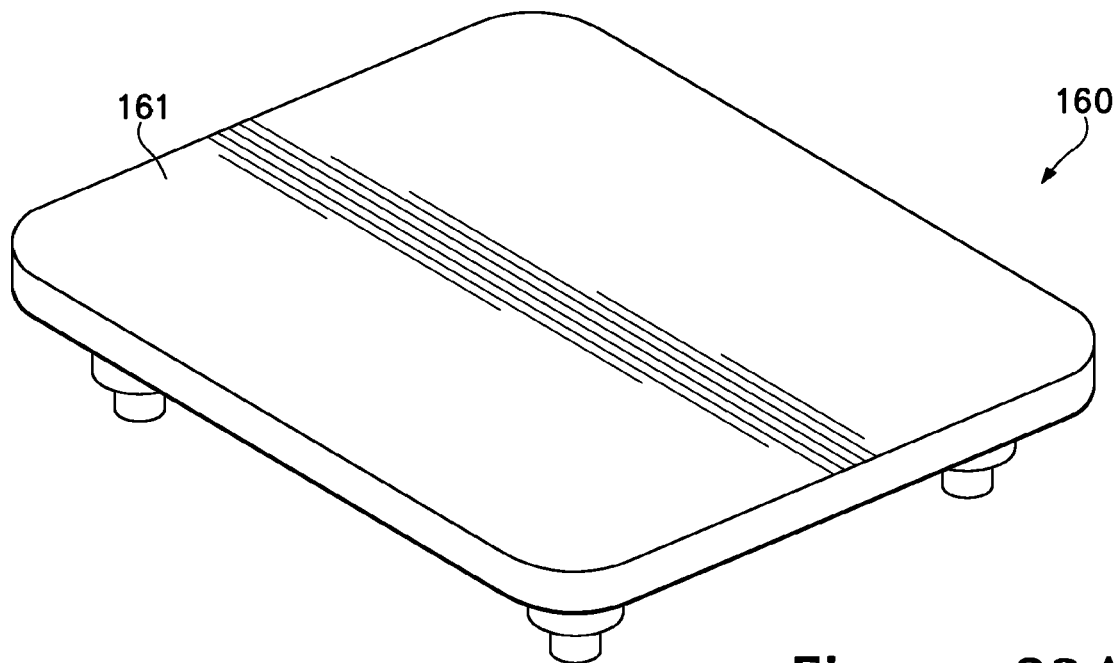
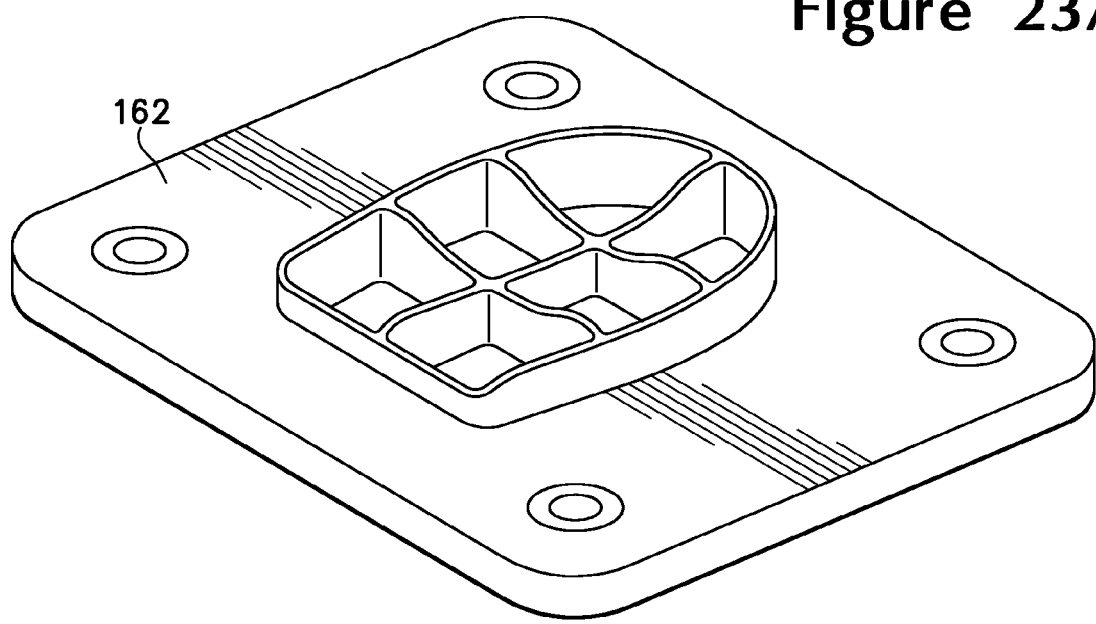
Figure 23A

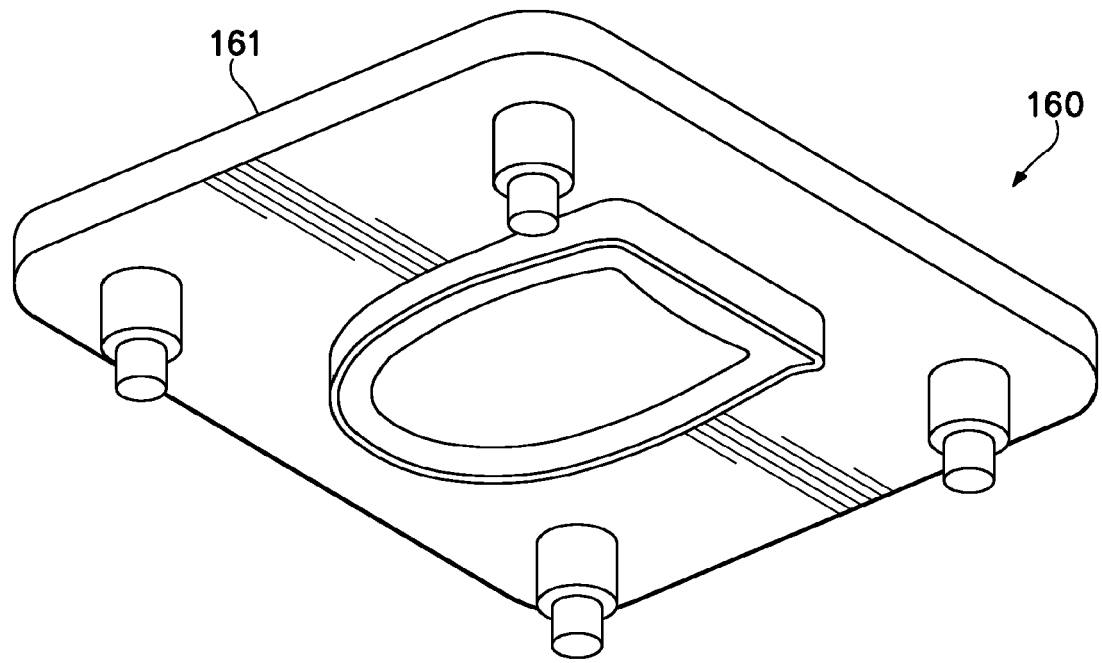
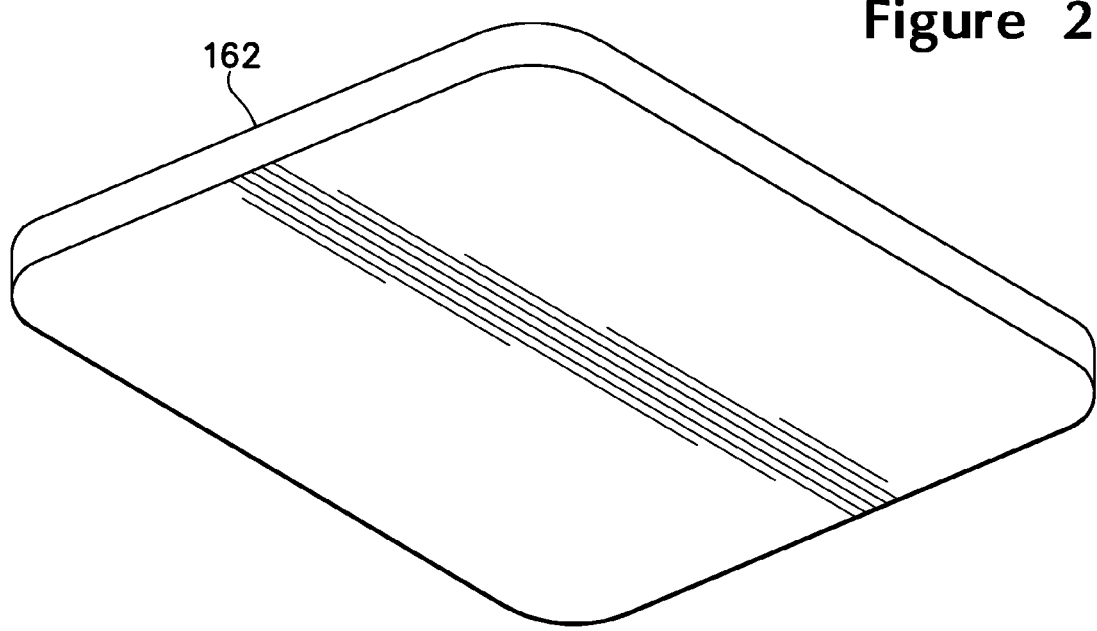
Figure 23B

ARTICLE OF FOOTWEAR INCORPORATING FOAM-FILLED ELEMENTS AND METHODS FOR MANUFACTURING THE FOAM-FILLED ELEMENTS

CROSS-REFERENCE TO RELATED APPLICATION

This application is a division of U.S. patent application Ser. No. 15/953,979, filed Apr. 16, 2018, which is a continuation of U.S. patent application Ser. No. 15/187,551, filed Jun. 20, 2016, which is a continuation of U.S. patent application Ser. No. 14/107,222, filed Dec. 16, 2013, which is a continuation of U.S. patent application Ser. No. 13/029,935, entitled "An Article of Footwear Incorporating Foam-Filled Elements and Methods for Manufacturing the Foam-Filled Elements," filed Feb. 17, 2011, which is a divisional of U.S. patent application Ser. No. 11/777,787, filed on Jul. 13, 2007, the disclosures of which are hereby incorporated by reference in their entirety.

BACKGROUND

Conventional articles of athletic footwear include two primary elements, an upper and a sole structure. The upper provides a covering for the foot that comfortably receives and securely positions the foot with respect to the sole structure. The sole structure is secured to a lower portion of the upper and is generally positioned between the foot and the ground. In addition to attenuating ground reaction forces, the sole structure may provide traction, control foot motions (e.g., by resisting pronation), and impart stability, for example. Accordingly, the upper and the sole structure operate cooperatively to provide a comfortable structure that is suited for a wide variety of athletic activities.

The sole structure generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole is conventionally secured to a lower surface of the upper and forms a middle layer of the sole structure that is primarily responsible for attenuating ground reaction forces. The outsole forms the ground-contacting element of footwear and is usually fashioned from a durable, wear-resistant material that includes texturing to improve traction.

The conventional midsole is primarily formed from a resilient, polymer foam material, such as polyurethane or ethylvinylacetate, that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the wearer or of the activity for which the footwear is intended to be used.

In addition to polymer foam materials, conventional midsoles may include, for example, one or more fluid-filled chambers. In general, the fluid-filled chambers are formed from an elastomeric polymer material that is sealed and pressurized. The chambers are then encapsulated in the polymer foam of the midsole such that the combination of the chamber and the encapsulating polymer foam functions as the midsole of the sole structure. In some configurations, textile or foam tensile members may be located within the chamber or reinforcing structures may be bonded to an exterior or interior of the chamber to impart shape to the chamber.

SUMMARY

One aspect relates to an article of footwear having an upper and a sole structure secured to the upper. The sole structure has a plurality of support elements, and each of the support elements include a shell and a core. The shell defines an interior void and is formed from a polymer material that extends around substantially all of the void. The core has a shape of the void and is located within the void, with at least a portion of the core being a polymer foam material. The polymer foam material of at least two of the support elements may have different densities.

Another aspect relates to a method of manufacturing a sole structure for an article of footwear. The method includes defining a plurality of depressions in a first polymer layer and partially filling the depressions with different volumes of a substantially unexpanded polymer foam material. The polymer foam material is then expanded to substantially fill the depressions, and a second polymer layer is secured to the first polymer layer to seal the polymer foam material within the depressions.

The advantages and features of novelty characterizing various aspects of the invention are pointed out with particularity in the appended claims. To gain an improved understanding of the advantages and features of novelty, however, reference may be made to the following descriptive matter and accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

FIG. 3 is a top plan view of a first sole component of the article of footwear.

FIG. 5 is a lateral side elevational view of the first sole component.

FIG. 6 is a medial side elevational view of the first sole component.

FIGS. 23A and 23B are perspective views of a bonding apparatus.

DETAILED DESCRIPTION

The following discussion and accompanying figures disclose a sole component for an article of footwear and methods for manufacturing the sole component. Concepts related to the sole component are disclosed with reference to footwear having a configuration that is suitable for running. The sole component is not limited solely to footwear designed for running, however, and may be utilized with a wide range of athletic footwear styles, including basketball shoes, tennis shoes, football shoes, cross-training shoes, walking shoes, soccer shoes, and hiking boots, for example. The sole component may also be utilized with footwear styles that are generally considered to be non-athletic, including dress shoes, loafers, sandals, and boots. An individual skilled in the relevant art will appreciate, therefore, that the concepts disclosed herein apply to a wide variety of footwear styles, in addition to the specific style discussed in the following material and depicted in the accompanying figures. The concepts disclosed herein may also be applied to products other than footwear, including seat cushions, gloves, and padding for helmets and other protective devices, for example.

Footwear Configuration

Figure 1:
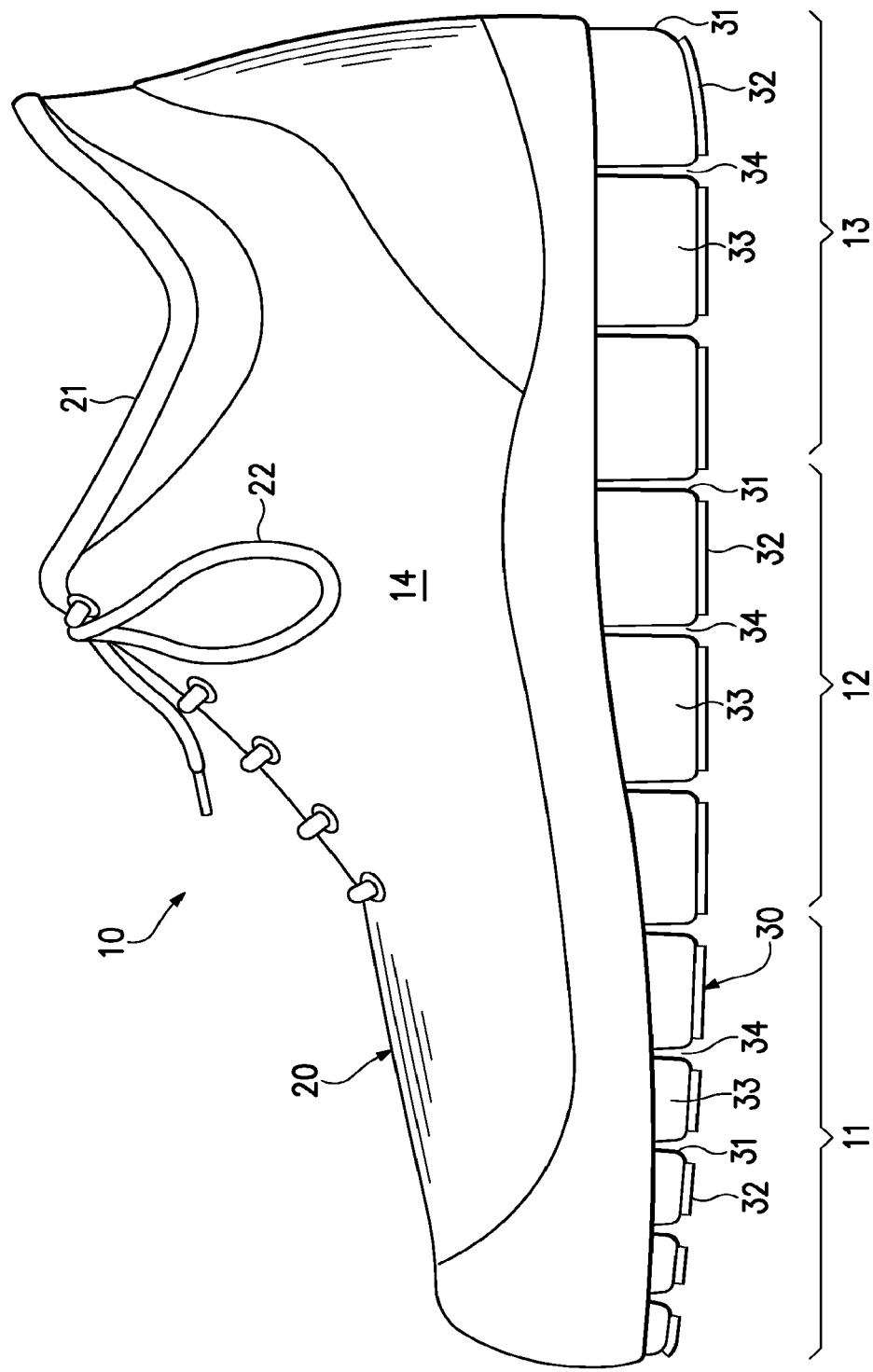
FIG. 1 is a lateral side elevational view of an article of footwear.
Figure 2:
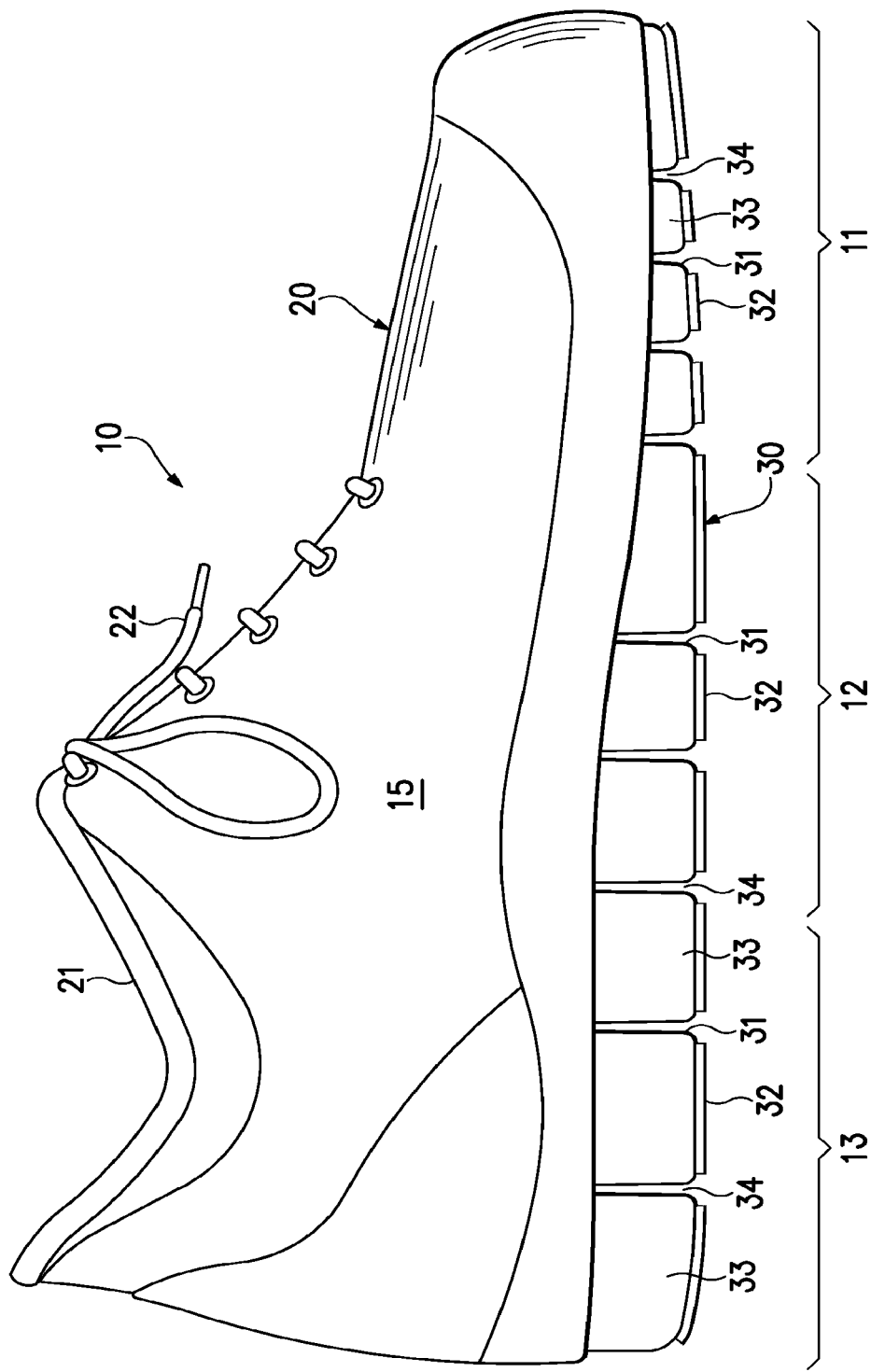
FIG. 2 is a medial side elevational view of the article of footwear.
Figure 4A:
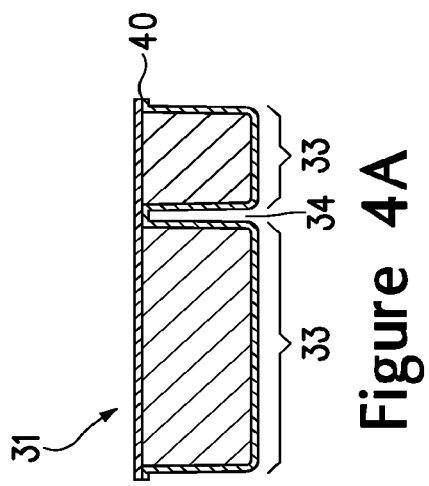
FIGS. 4A and 4B are cross-sectional views of the first sole component, as defined by section lines 4A and 4B in FIG. 3.
Figure 4B:
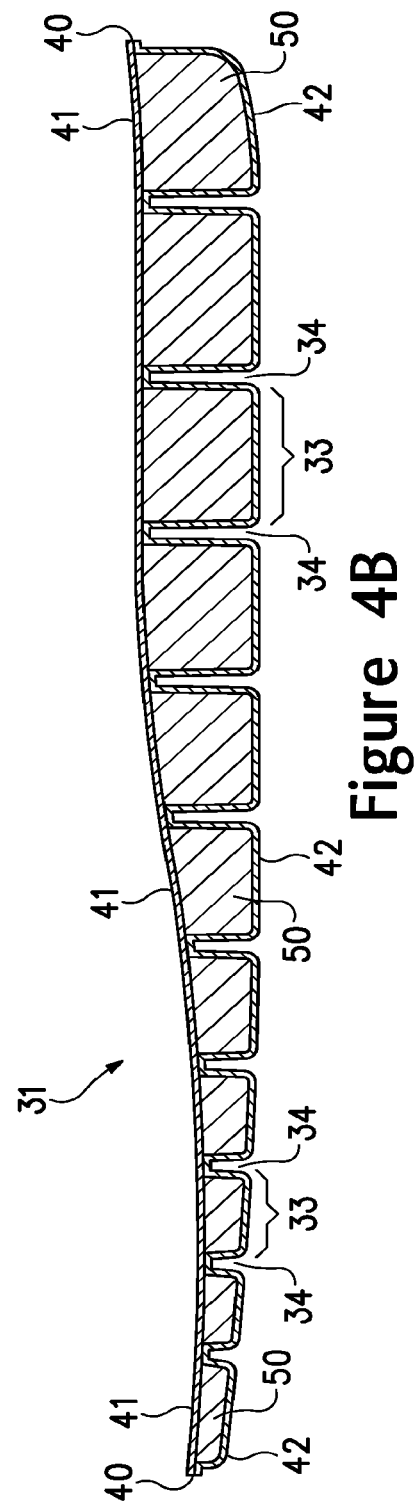

An article of footwear 10 is depicted in FIGS. 1 and 2 as including an upper 20 and a sole structure 30. For reference purposes, footwear 10 may be divided into three general regions: a forefoot region 11, a midfoot region 12, and a heel region 13. Footwear 10 also includes a lateral side 14 and an opposite medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements of either of upper 20 and sole structure 30.

Upper 20 is depicted as having a substantially conventional configuration incorporating a plurality material elements (e.g., textiles, foam, leather, and synthetic leather) that are stitched or adhesively bonded together to form an interior void for securely and comfortably receiving a foot. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Given that various aspects of the present application primarily relate to sole structure 30, upper 20 may exhibit the general configuration discussed above or the general configuration of practically any other conventional or non-conventional upper. Accordingly, the structure of upper 20 that is utilized with sole structure 30 or variants thereof may vary significantly.

Sole structure 30 is secured to upper 20 and has a configuration that extends between upper 20 and the ground. The primary elements of sole structure 30 are a sole component 31 and a plurality of outsole sections 32. Sole component 31, which is depicted individually depicted in FIGS. 3-7, is secured to upper 20 and extends through each of regions 11-13 and between sides 14 and 15. As discussed in greater detail below, sole component 31 includes a plurality of downwardly-extending support elements 33 that are separated by various flexion indentations 34. Support elements 33 form independent portions of sole structure 30 that compress to attenuate ground reaction forces, and flexion indentations 34 extend between support elements 33 to permit sole structure 30 to flex or otherwise bend during walking, running, and other ambulatory activities. Outsole sections 32, which may be absent in some configurations, are secured to a lower surface of each of support elements 33 and are formed from a durable, wear-resistant material (e.g., rubber) that may include texturing to improve traction.

Sole Component Configuration

Sole component 31 includes an outer shell 40 and a compressible foam material 50 located within shell 40. An upper portion of shell 40, which is adjacent to upper 20, is formed from a first layer 41 of a polymer material, and a lower portion of shell 40 is formed from a second layer 42 of the polymer material. Whereas first layer 41 has a relatively planar configuration and forms an upper surface of the various support elements 33, second layer 42 is contoured to form sidewalls and a lower surface of support elements 33. That is, second layer 42 defines voids or depressions for receiving foam material 50. In addition, layers 41 and 42 are bonded or otherwise joined to each other to seal the various support elements 33 in upper portions of flexion indentations 34.

Figure 7:
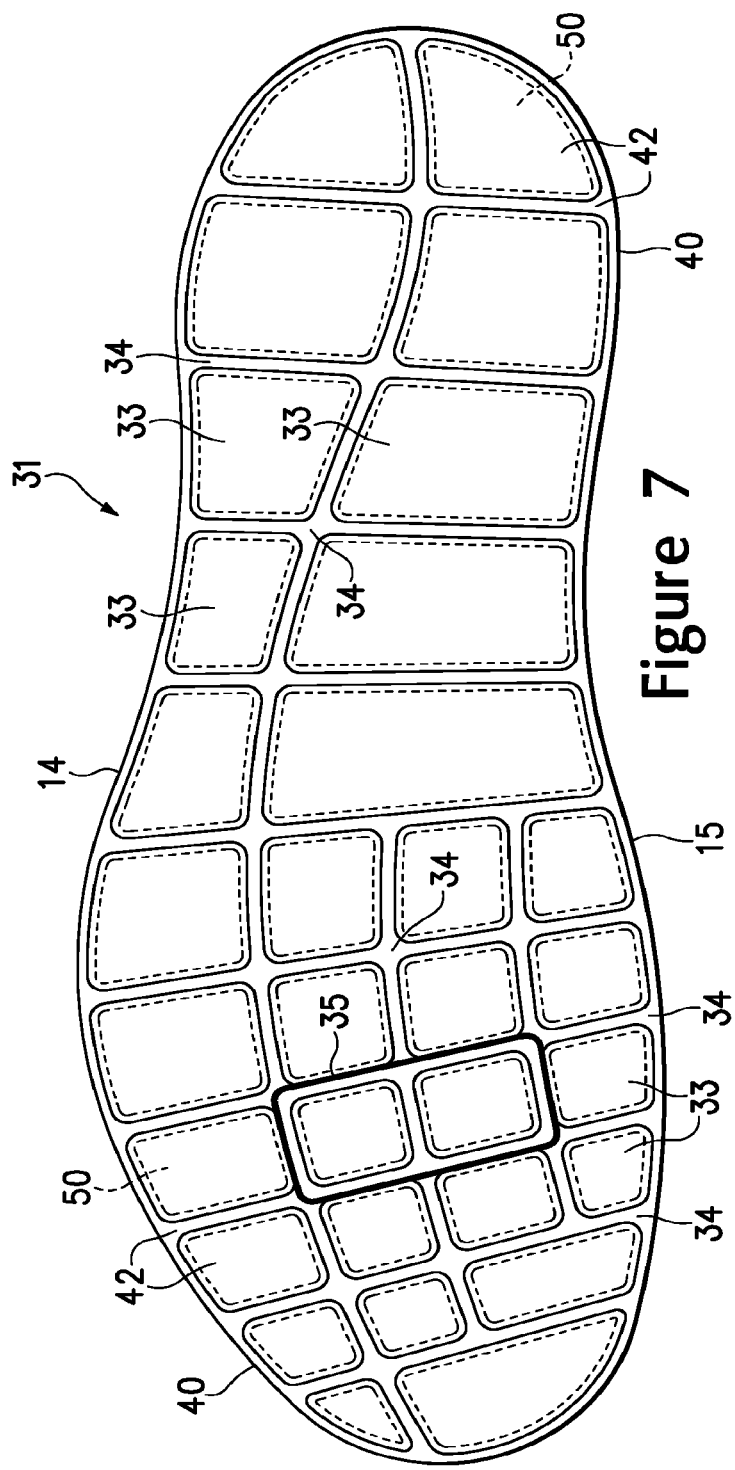
FIG. 7 is a bottom plan view of the first sole component.

The contours of second layer 42 define support elements 33 and the various flexion indentations 34 that extend between support elements 33. In general, support elements 33 are discrete portions of sole component 31 that extend downward from upper 20. The shape of each support element 33 is partially determined by the positions of the various flexion indentations 34. As depicted in FIG. 7, three of flexion indentations 34 extend in a longitudinal direction along sole structure 30, and a majority of flexion indentations 34 extend in a generally lateral direction. This positioning of flexion indentations 34 forms a majority of support elements 33 to exhibit a generally square, rectangular, or trapezoidal shape. The rearmost support elements 33 have a quarter-circular shape due to the curvature of sole structure 30 in heel region 13. Although the number and positions of flexion indentations 34 may vary considerably, in some configurations sole structure 30 has at least one flexion indentation 34 extending in the longitudinal direction along sole structure 30, and at least two flexion indentations 34 extending in the lateral direction.

The shape of each support element 33, as discussed above, is partially determined by the positions of the various flexion indentations 34, which are spaces that extend upward into sole component 31. As depicted, flexion indentations 34 extend through a majority of the thickness of sole component 31 (i.e., almost entirely between the lower and upper surfaces), In some configurations, flexion indentations 34 may only extend through one-half of a distance between the lower and upper surfaces if both layers 41 and 42 are contoured to form flexion indentations 34 in this manner.

Flexion indentations 34 increase the flexibility of sole structure 30 by forming an articulated configuration in sole component 31. Whereas the conventional footwear midsole is a unitary element of polymer foam, flexion indentations 34 form flexion lines in sole component 31 and, therefore, have an effect upon the directions of flex in sole structure 30. Lateral flexibility of sole structure 30 (i.e., flexibility in a direction that extends between lateral side 14 and medial side 15) is provided by the three longitudinal flexion indentations 34. Whereas one of the longitudinal flexion indentations 34 extends longitudinally through an entire length of sole component 31 (i.e., through all three of regions 11-13), the other two longitudinal flexion indentations 34 extend only through about half of a length of sole component 31. Although each of the longitudinal flexion indentations 34 may have a straight or linear configuration, the longitudinal flexion indentations 34 are depicted as having a generally curved or s-shaped configuration. In forefoot region 11 and midfoot region 12, the longitudinal flexion indentation 34 extending through the entire length of sole component 31 is adjacent to and spaced inward from lateral side 14, but is centrally-located in heel region 13. In further configurations of sole structure 30, each of the longitudinal flexion indentations 34 may extend through the entire length of sole component 31, or none of the longitudinal flexion indentations 34 may extend through the entire length of sole component 31.

Longitudinal flexibility of sole structure 30 (i.e., flexibility in a direction that extends between regions 11 and 13) is provided by ten lateral flexion indentations 34. Referring to FIG. 7, the lateral flexion indentations 34 are generally parallel to each other and extend in a medial-lateral direction (i.e., between sides 14 and 15). Although the lateral flexion indentations 34 have a generally parallel configuration and extend in the medial-lateral direction, the lateral flexion indentations 34 in forefoot region 11 are somewhat angled with respect to the lateral flexion indentations 34 in heel region 13. Although each of the lateral flexion indentations 34 are depicted as extending entirely across sole component 31, some or all of the lateral flexion indentations 34 may extend only partially across sole component 31 in some configurations.

The positions and orientations of flexion indentations 34 are selected to complement the natural motion of the foot during the running cycle. In general, the motion of the foot during running proceeds as follows: Initially, the heel strikes the ground, followed by the ball of the foot. As the heel leaves the ground, the foot rolls forward so that the toes make contact, and finally the entire foot leaves the ground to begin another cycle. During the time that the foot is in contact with the ground, the foot typically rolls from the outside or lateral side to the inside or medial side, a process called pronation. That is, normally, the outside of the heel strikes first and the toes on the inside of the foot leave the ground last. The longitudinal flexion indentations 34 provide lateral flexibility in order to permit the foot to pronate naturally during the running cycle. The lateral flexion indentations 34 ensure that the foot remains in a neutral foot-strike position and complement the forward roll of the foot as it is in contact with the ground. Similarly, the angled configuration of the lateral flexion indentations 34, as discussed above, provides additional flexibility that further enhances the natural motion of the foot.

In addition to flexing that complements the natural motion of the foot, sole component 31 compresses to attenuate ground reaction forces (i.e., to provide cushioning for the foot). As discussed above, each of support elements 33 form independent elements of sole structure 30 that incorporate foam material 50. As sole structure 30 is compressed between the foot and the ground, foam material 50 compresses to impart cushioning to the foot. As the foot leaves the ground, the compressive forces upon support elements 33 are reduced and foam material 50 expands to its original, uncompressed configuration. During walking, running, and other ambulatory activities, therefore, support elements 33 compress to attenuate ground reaction forces experienced by the foot. Depending upon the configuration, sole component 31 may also impart stability or limit various foot motions, such as pronation.

The degree to which support elements 33 compress at least partially depends upon the density of foam material 50, which forms a core of the various support elements 33. In general, as the density of foam material 50 increases, the compressibility of foam material 50 decreases. That is, greater forces are required to deflect foam material 50 as the density of foam material 50 increases. By varying the density of foam material 50 in different portions of sole component 31, the compressive forces generated by the foot during various portions of the running cycle may be accounted for. As an example, the foam material 50 located in heel region 13 may have a lesser density than the foam material 50 located in each of midfoot region 12 and forefoot region 11 to account for differences between forces experienced by the sole component 31 during heel strike and as the foot rolls forward. As another example, the foam material 50 located adjacent to lateral side 14 may have a greater density than the foam material 50 located adjacent to medial side 15 in order to reduce the rate of pronation as the foot rolls toward lateral side 14. In other examples, multiple densities of foam material 50 may be utilized in different areas of sole component 31. Accordingly, the density of foam material 50 may vary throughout sole component 31 to attenuate ground reaction forces, control foot motions, and impart stability, for example.

A variety of polymer materials may be utilized for shell 40. In selecting a material for shell 40, consideration may be given to the engineering properties of the material (e.g., tensile strength, stretch properties, fatigue characteristics, dynamic modulus, and loss tangent). When formed of thermoplastic urethane, for example, the walls of shell 40 may have a thickness of approximately 1.0 millimeter (0.040 inches), but the thickness may range from 0.25 millimeter (0.010 inches) to 3.0 millimeters (0.120 inches) or more, for example. In addition to thermoplastic urethane, a variety of other thermoplastic or thermoset polymer materials may be utilized for shell 40, including polyurethane, polyester, polyester polyurethane, and polyether polyurethane. Additionally, any of the materials disclosed in U.S. Pat. Nos. 5,713,141 and 5,952,065 to Mitchell, et al.; U.S. Pat. Nos. 6,013,340, 6,082,025, 6,127,026, 6,203,868, and 6,321,465 to Bonk, et al.; and U.S. Pat. Nos. 4,183,156, 4,219,945, 4,936,029, and 5,042,176 to Rudy may be utilized for shell 40. As with shell 40, a variety of thermoplastic and thermoset polymer foam materials may be utilized for foam material 50, including polyurethane and ethylvinylacetate, for example. Accordingly, a variety of materials may be suitable for each of shell 40 and foam material 50.

Manufacturing Process

Figure 8:
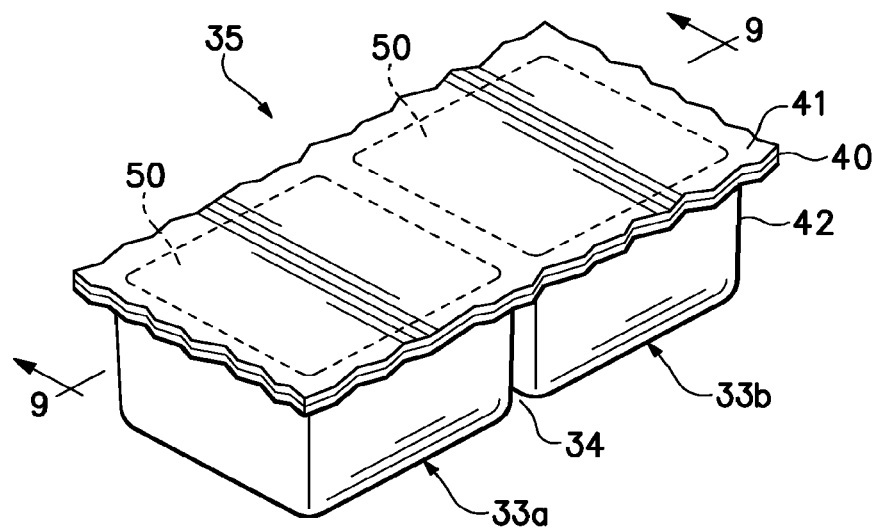
FIG. 8 is a perspective view of a portion of the first sole component.
Figure 9:
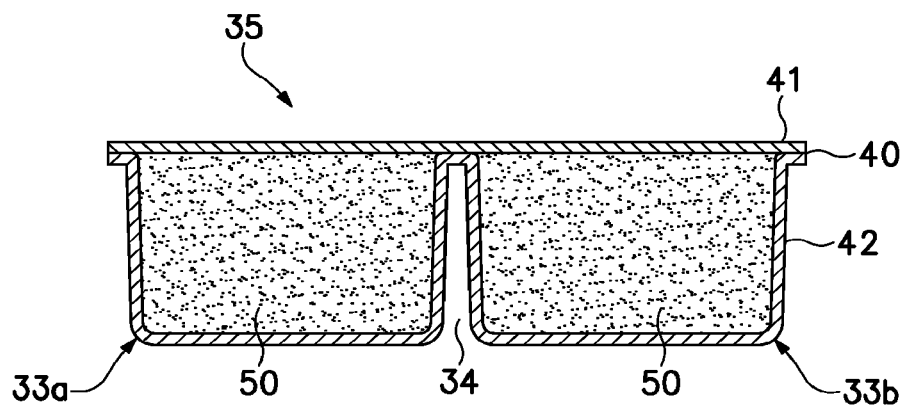
FIG. 9 is a cross-sectional view of the portion of the first sole component, as defined by section line 9 in FIG. 8.
Figure 10:
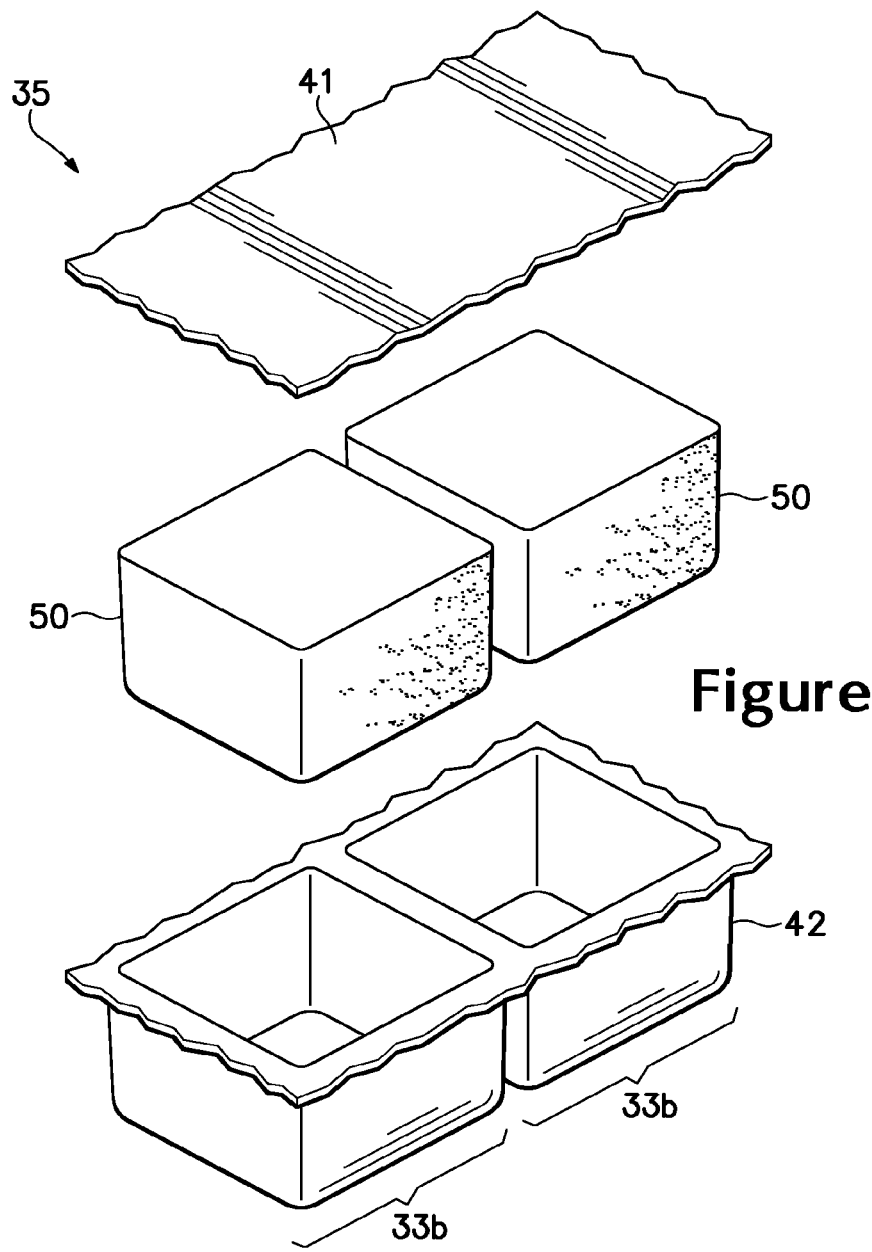
FIG. 10 is an exploded perspective view of the portion of the first sole component.

For purposes of discussing a manufacturing process for sole component 31, a portion 35 of sole component 31 is identified in FIGS. 3 and 7 and also depicted individually (i.e., separate from a remainder of sole component 31) in FIGS. 8-10. Portion 35 includes two support elements 33, which are separately identified as support elements 33a and 33b for purposes of reference. A portion of one of flexion indentations 34 extends between support elements 33a and 33b. As with the remainder of sole component 31, layers 41 and 42 of shell 40 are shaped to define support elements 33a and 33b, and foam material 50 is located within support elements 33a and 33b. As discussed above, the density of foam material 50 may vary throughout sole component 31. Through the manufacturing process discussed below, support element 33a is formed to have greater compressibility than support element 33b. More particularly, portion 35 is formed such that foam material 50 within support element 33a exhibits lesser density than foam material 50 within support element 33b.

Figure 11A:
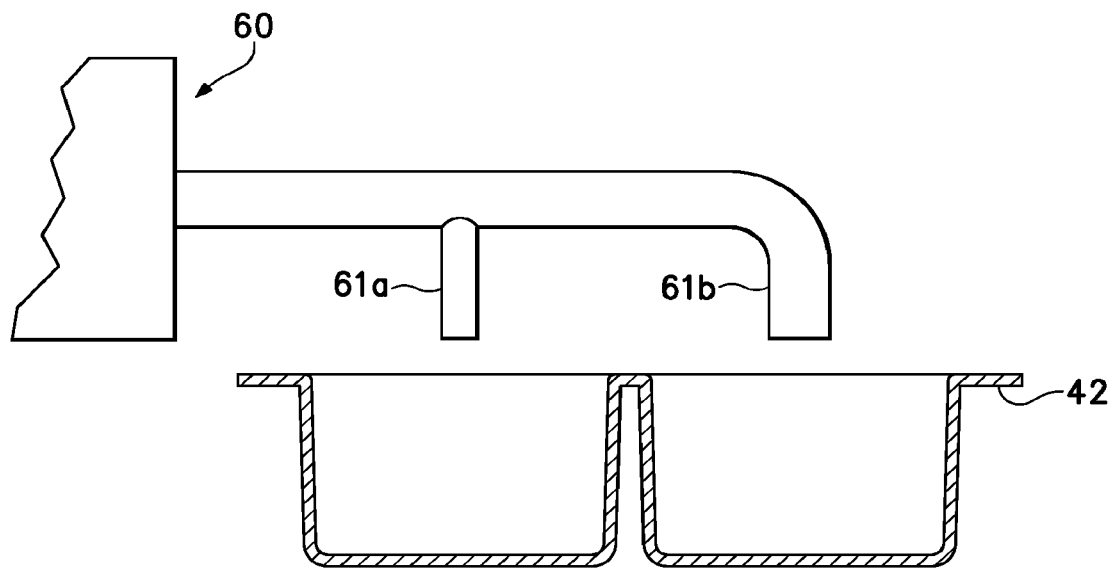
FIGS. 11A-11F are schematic side elevational views of a manufacturing process for forming the portion of the first sole component.
Figure 11B:
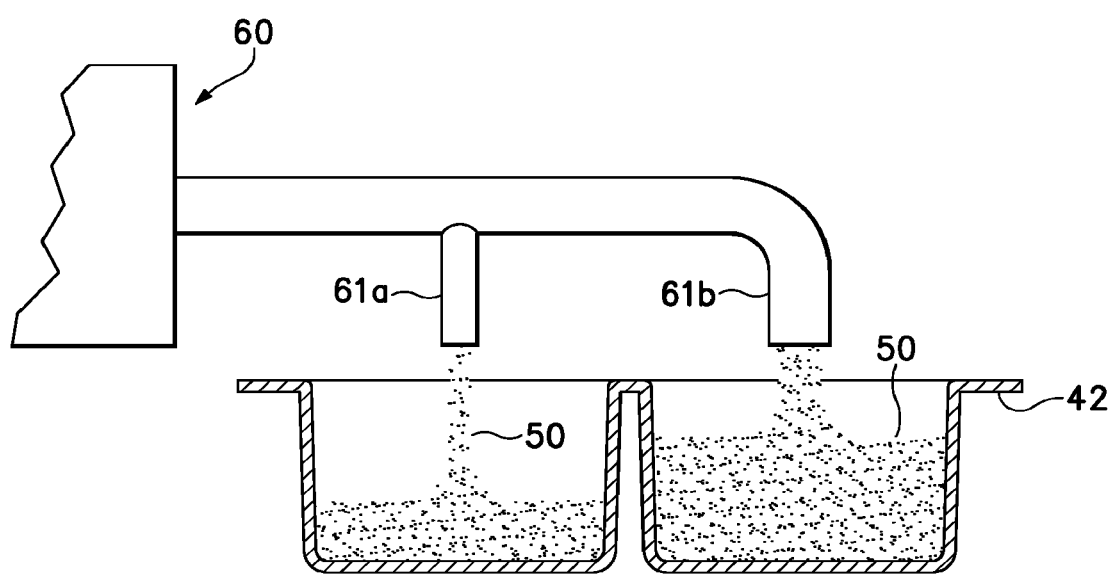

With reference to FIG. 11A, a foam source 60 is schematically-depicted as having a pair of outlet conduits 61a and 61b that are respectively positioned above depressions in second layer 42 that form support elements 33a and 33b. Outlet conduits 61a and 61b are depicted as having different widths, with outlet conduit 61a having a narrower configuration than outlet conduit 61b. Once second layer 42 is properly positioned below outlet conduits 61a and 61b, foam material 50 is simultaneously ejected from outlet conduits 61a and 61b and pours into or otherwise enters the depressions in second layer 42, as depicted in FIG. 11B. Due to differences in the widths of outlet conduits 61a and 61b, the quantity of foam material 50 entering the depressions is different. That is, a greater volume of foam material 50 is expelled from outlet conduit 61b than outlet conduit 61a.

Figure 11C:
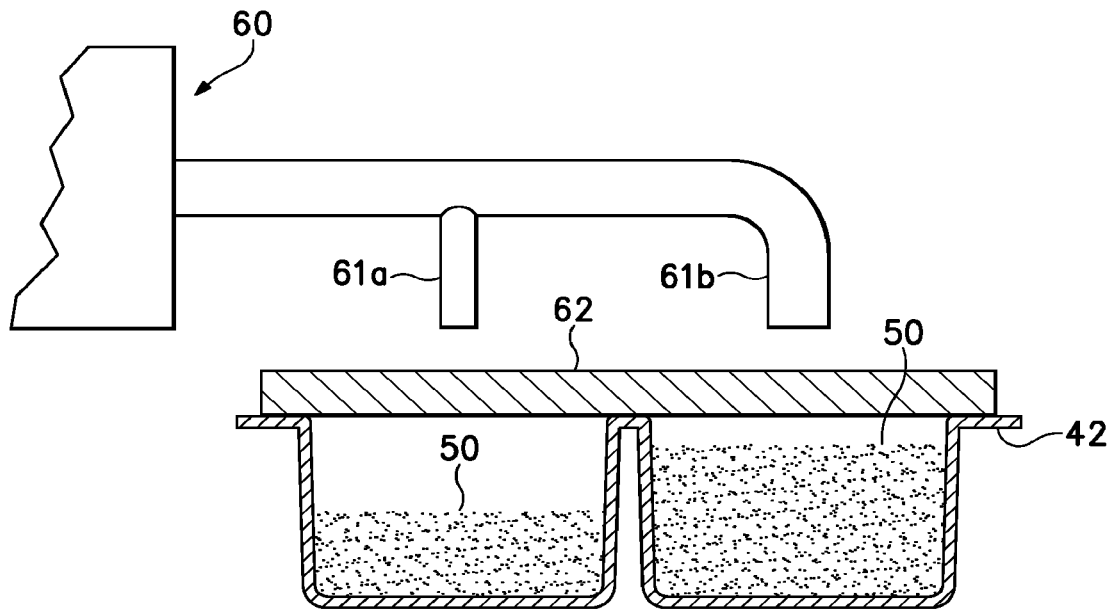
Figure 11D:
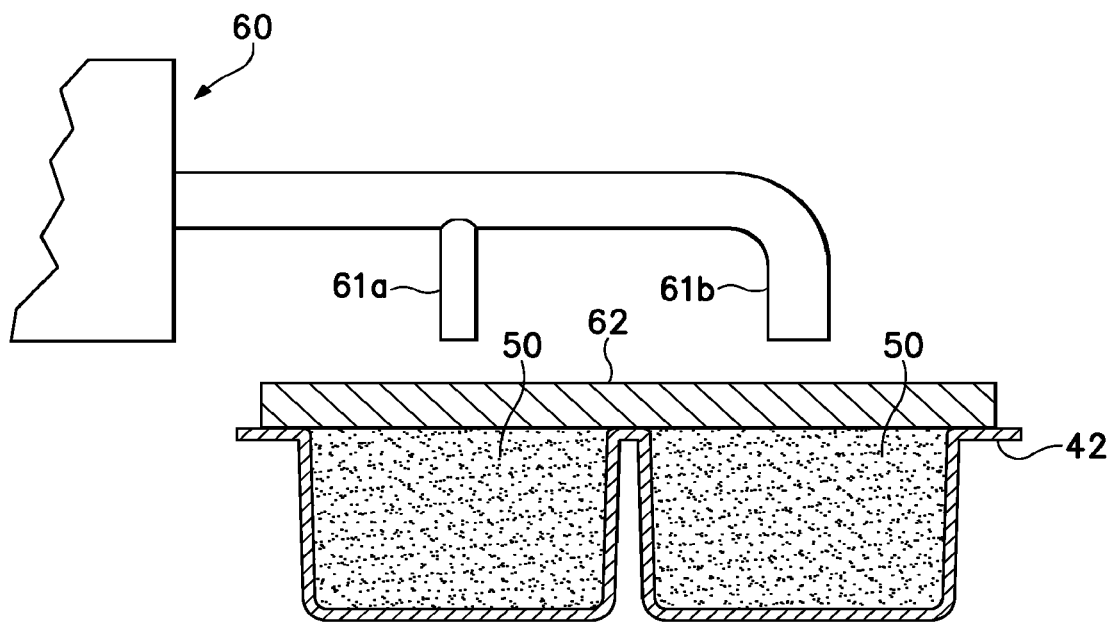

Once the depressions in second layer 42 are filled with a pre-determined amount of foam material 50, foam source 60 ceases the supply of foam material 50 and a permeable block 62 is placed above the depressions, as depicted in FIG. 11C. When expelled from outlet conduits 61a and 61b, foam material 50 may be in a pre-foamed state that expands after entering the depressions in second layer 42. Foam material 50 may also be in a partially-foamed state that continues expanding after entering the depressions in second layer 42. That is, foam material 50 may include a reactive material that forms gas-filled voids within foam material 50 after entering the depressions in second layer 42. Permeable block 62 permits air within the depressions in second layer 42 and gas that is produced from the reaction within foam material 50 to escape the depressions in second layer 42, but effectively blocks foam material 50 from expanding above the depressions in second layer 42. Accordingly, foam material 50 expands to fill the depressions in second layer 42, as depicted in FIG. 11D, but foam material 50 substantially remains within the depressions due to the presence of permeable block 62.

Figure 11E:
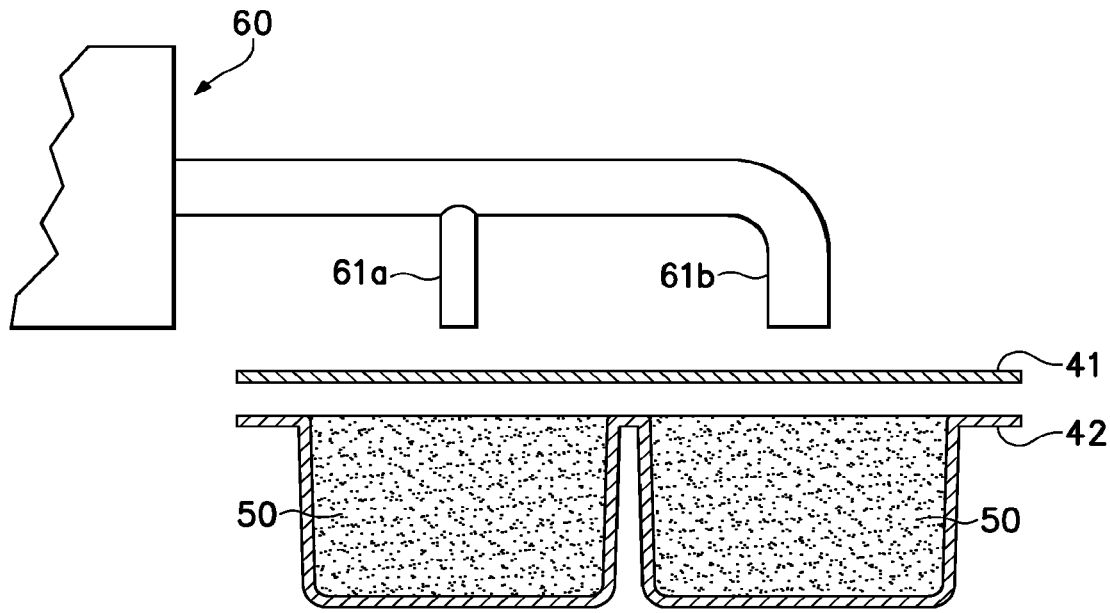
Figure 11F:
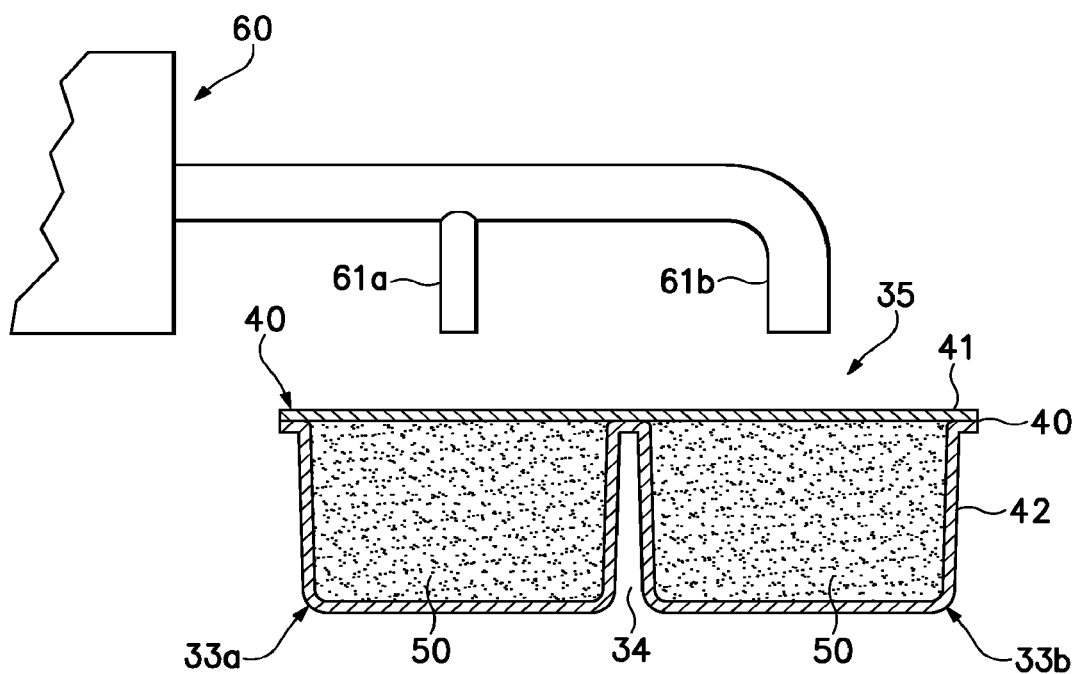

Following the expansion of foam material 50, permeable block 62 is removed and first layer 41 is located relative to second layer 42 and foam material 50, as depicted in FIG. 11E. First layer 41 is then bonded to second layer 42, as depicted in FIG. 11F, to effectively complete the manufacture of portion 35. In some configurations, first layer 41 may also be bonded to an upper surface of foam material 50. In order to bond first layer 41 to second layer 42, a bonding apparatus having the features of a bonding apparatus 160, which is discussed below, may be utilized. Although the manufacturing process discussed above is described with reference to portion 35, one skilled in the relevant art will appreciate that concepts associated with the manufacturing process of portion 35 may be applied to the entirety of sole component 31. That is, the general process discussed above may be utilized to form the entirety of sole component 31.

As discussed above, different quantities of foam material 50 entered the depressions in second layer 42 due to differences in outlet conduits 61a and 61b. The different quantities have an effect upon the resulting densities of foam material 50 within each of support elements 33a and 33b. More particularly, support element 33a received a lesser quantity of foam material than support element 33b, and the density of foam material 50 within support element 33a is less than the density of foam material 50 within support element 33b. By varying the supply of foam material 50, therefore, the density within the support elements 33a and 33b also varies. Although physical differences (e.g., width, diameter, etc.) in outlet conduits 61a and 61b may be utilized to affect the relative quantities of foam material 50 entering the depressions in second layer 42, shut-off valves and other techniques may be utilized to provide each of the depressions with different quantities of foam material 50.

Given that the volumes of support elements 33a and 33b are substantially similar, the different quantities of foam material 50 resulted in different densities. In configurations where support elements 33a and 33b have different volumes, the different quantities of foam material 50 may result in substantially similar densities. Referring to sole component 31, for example, many of the various support elements 33 are depicted as having different sizes. The various quantities of foam material 50 that are located within each of support elements 33 may result, therefore, in different densities, substantially similar densities, or a variety of density configurations. Accordingly, the physical differences (e.g., width, diameter, etc.) in outlet conduits 61a and 61b may be utilized to affect the relative quantities of foam material 50 entering the depressions in second layer 42, thereby resulting in the particular densities that are desired for different footwear styles.

Permeable block 62 permits gas that is produced from the reaction within foam material 50 to escape the depressions in second layer 42, but effectively blocks foam material 50 from expanding above the depressions in second layer 42. An example of a material that may be utilized for permeable block 62 is a cellular structure metal material. As known in the art, a cellular structure metal material is primarily formed from a metal base member that includes various voids (e.g., cells or pores) formed therein. Like a polymer foam, which includes a base polymer with various cells or pores, a cellular structure metal material defines the various voids, which form fluid-filled (e.g., air, gas, liquid) cells that reduce the overall density of the cellular structure metal material in comparison with the base metal. Accordingly, the cellular structure metal material may also be referred to as a cellular foam or a cellular metal foam.

The cellular structure metal material forming permeable block 62 may have a density that ranges between two percent and ninety-eight percent of the density of the base metal without the cellular structure. In comparison with a non-cellular metal, therefore, the density of the cellular structure metal material may be two percent, ten percent, twenty-five percent, fifty percent, seventy-five percent, or ninety-five percent, for example, of the density of the same metal material without a cellular structure. Despite the reduced amount of structural material due to the presence of voids, the resulting material of the cellular structure metal material maintains sufficient physical properties, such as strength, rigidity, and deformation resistance, for use in a mold for sole component 31.

The cellular structure metal material forming permeable block 62 may have an open cellular structure. In the open cellular structure, voids may interconnect or otherwise be in fluid communication. As an example, air may pass through the cellular structure metal material due to the interconnecting voids, thereby giving the cellular structure metal material a porous or air-permeable property. The voids may be generally formed throughout the three dimensional structure of permeable block 62. In addition, the porous structure of permeable block 62 is selected such that foam material 50 does not plug or otherwise disrupt the flow of air or other gasses that are passing through permeable block 62.

While any desired type of metal or other material may be used for the cellular structure metal material, more specific examples of suitable metal materials include aluminum, titanium, nickel, copper, zinc, carbon, zirconium, tungsten, lead, molybdenum, and/or combinations and alloys thereof (such as nickel-aluminum alloys, pewter, brass, etc.). Also, any desired method of making the cellular structure material may be used without departing from the invention, including conventional ways that are known and used by commercial vendors of cellular structure metal materials, such as: ALM (Applied Lightweight Materials) GmbH of Saarbrucken, Germany; Alulight International GmbH of Ranshofen, Austria; Cymat Corporation of Mississauga, Ontario, Canada; ERG Materials and Aerospace Corporation of Oakland, Calif.; Foamtech Co., Ltd. of Seoul, Korea; FiberNide Ltd. of Ontario, Canada; Gleich GmbH of Kaltenkirchen, Germany; Hütte Klein-Reichenbach Ges.m.b.H of Schwarzenau, Austria; Inco Ltd. of Toronto, Ontario, Canada; Korea Metalfoam of Choenan, Korea; Mitsubishi Materials Corporation of Okegawa-shi, Japan; M-Pore GmbH of Dresden, Germany; Porvair Advanced Materials of Hendersonville, N.C.; Recemat International B.V. of the Netherlands; Reade Advanced Materials of Providence, R.I.; Spectra-Mat, Inc. of Watsonville, Calif.; SAS Solea of Boussens, France; and Ultramet Corporation of Pacoima, Calif. In addition, the various materials and methods of making them are described in U.S. Pat. Nos. 6,932,146; 6,866,084; 6,840,301; 6,706,239; 6,592,787; 5,951,791; 5,700,363; and 4,957,543.

Manufacturing Apparatus

Figure 12:
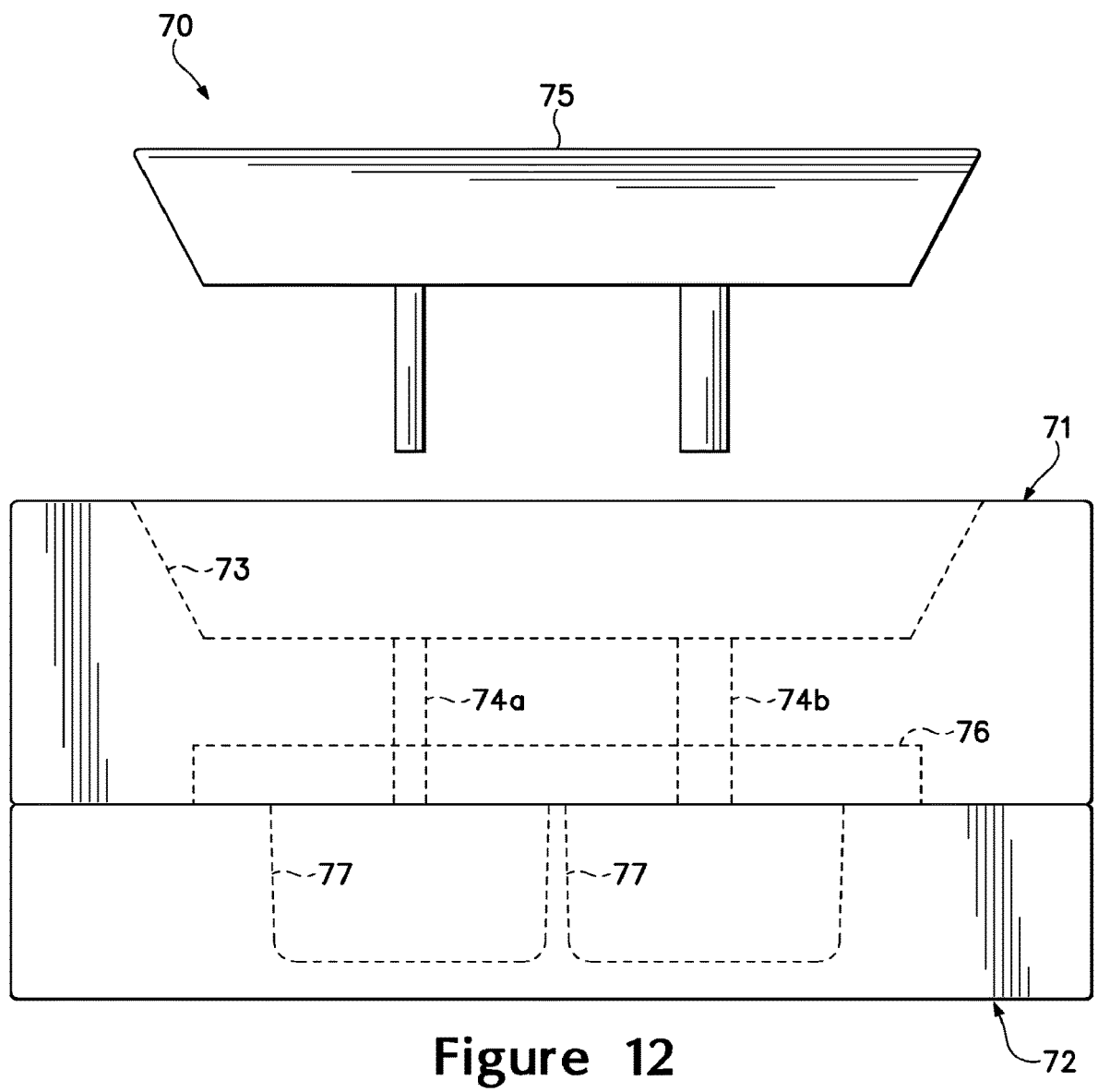
FIG. 12 is a side elevational view of an apparatus that may be utilized in the manufacturing process.
Figure 13:
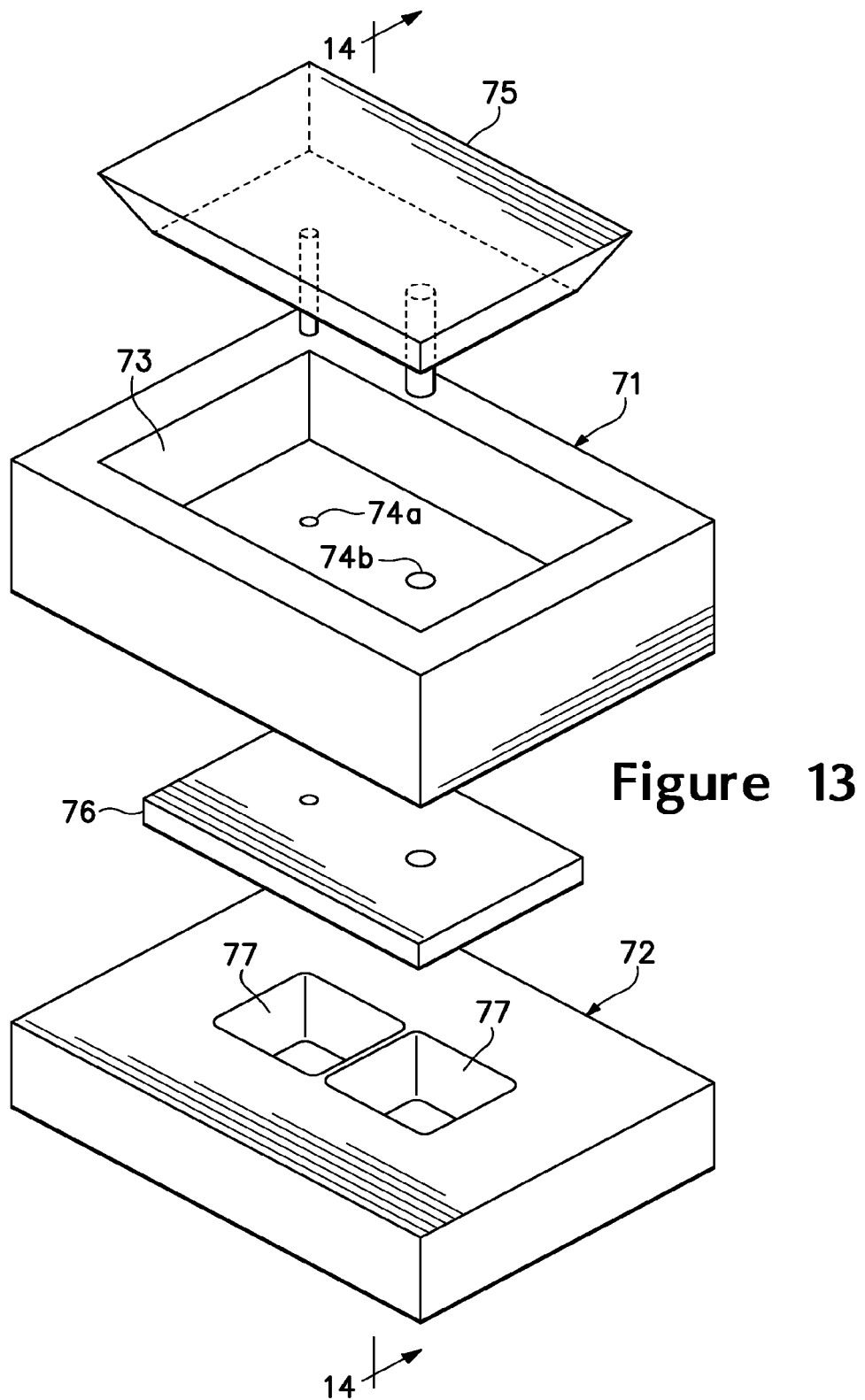
FIG. 13 is an exploded perspective view of the apparatus.
Figure 14:
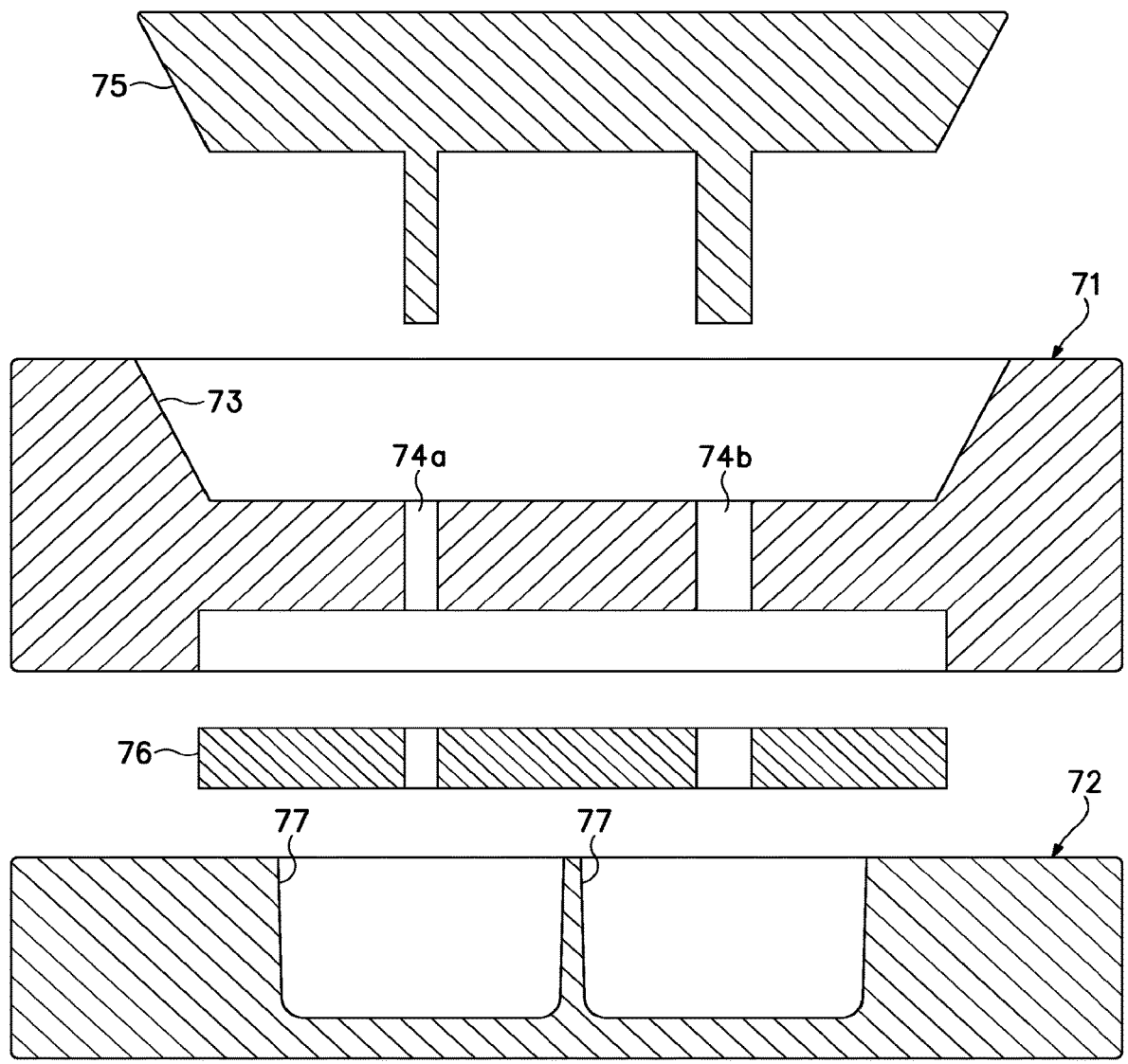
FIG. 14 is an exploded cross-sectional view of the apparatus, as defined by section line 14-14 in FIG. 13.

Foam source 60 provides differing quantities of foam material 50 to each of support elements 33a and 33b. An alternative to foam source 60 is depicted in FIGS. 12-14 as a mold 70. The primary elements of mold 70 are an upper mold portion 71 and a lower mold portion 72. Upper mold portion 71 includes a depression 73, a pair of outlet conduits 74a and 74b, a sealing lid 75, and a permeable block 76. Lower mold portion 72 includes a pair of cavities 77 that are shaped to correspond with and receive the various depressions in second layer 42.

Figure 15A:
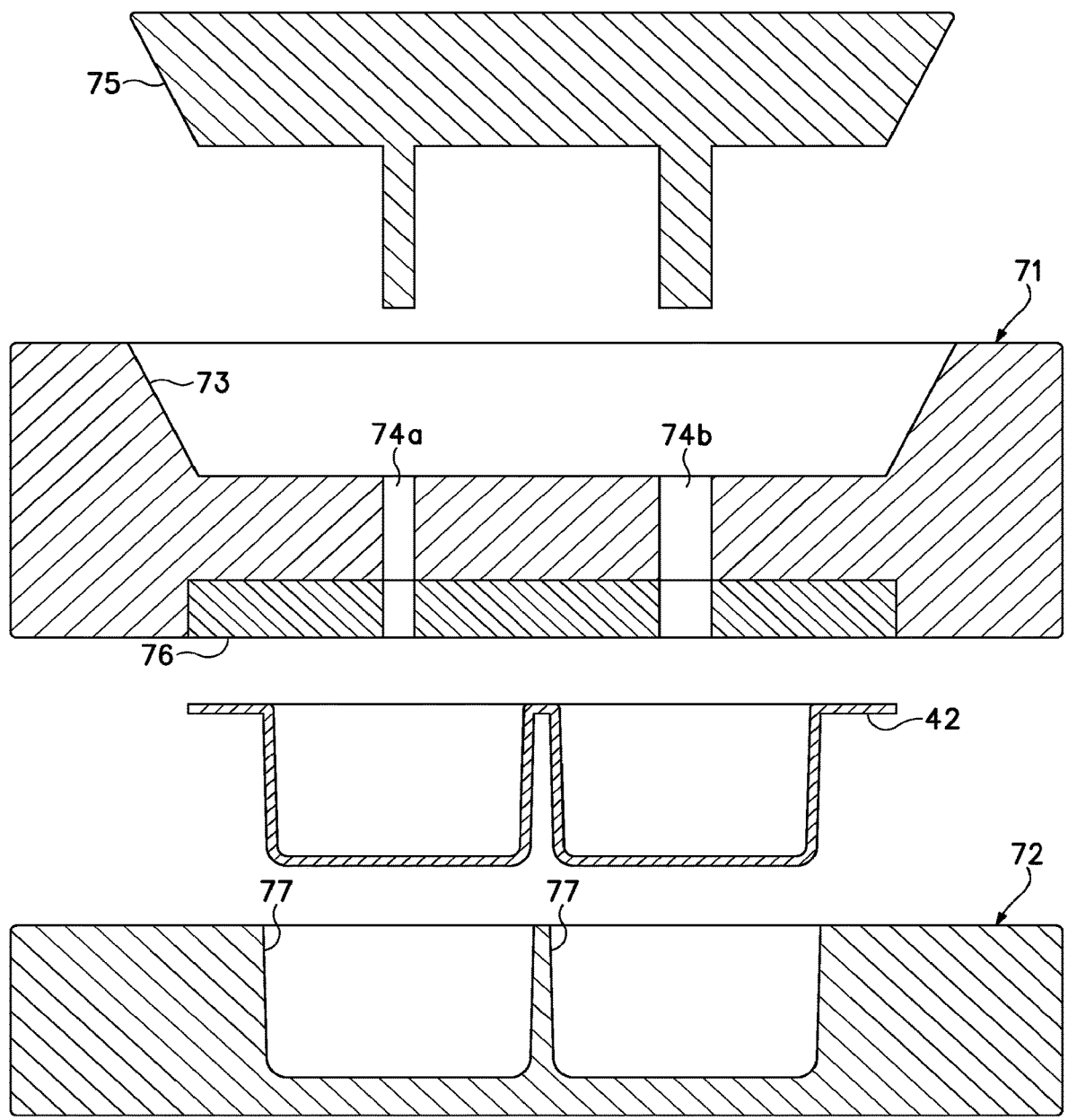
FIGS. 15A-15F are cross-sectional views of the apparatus that correspond to FIG. 14 and depict another manufacturing process for forming the portion of the first sole component.
Figure 15B:
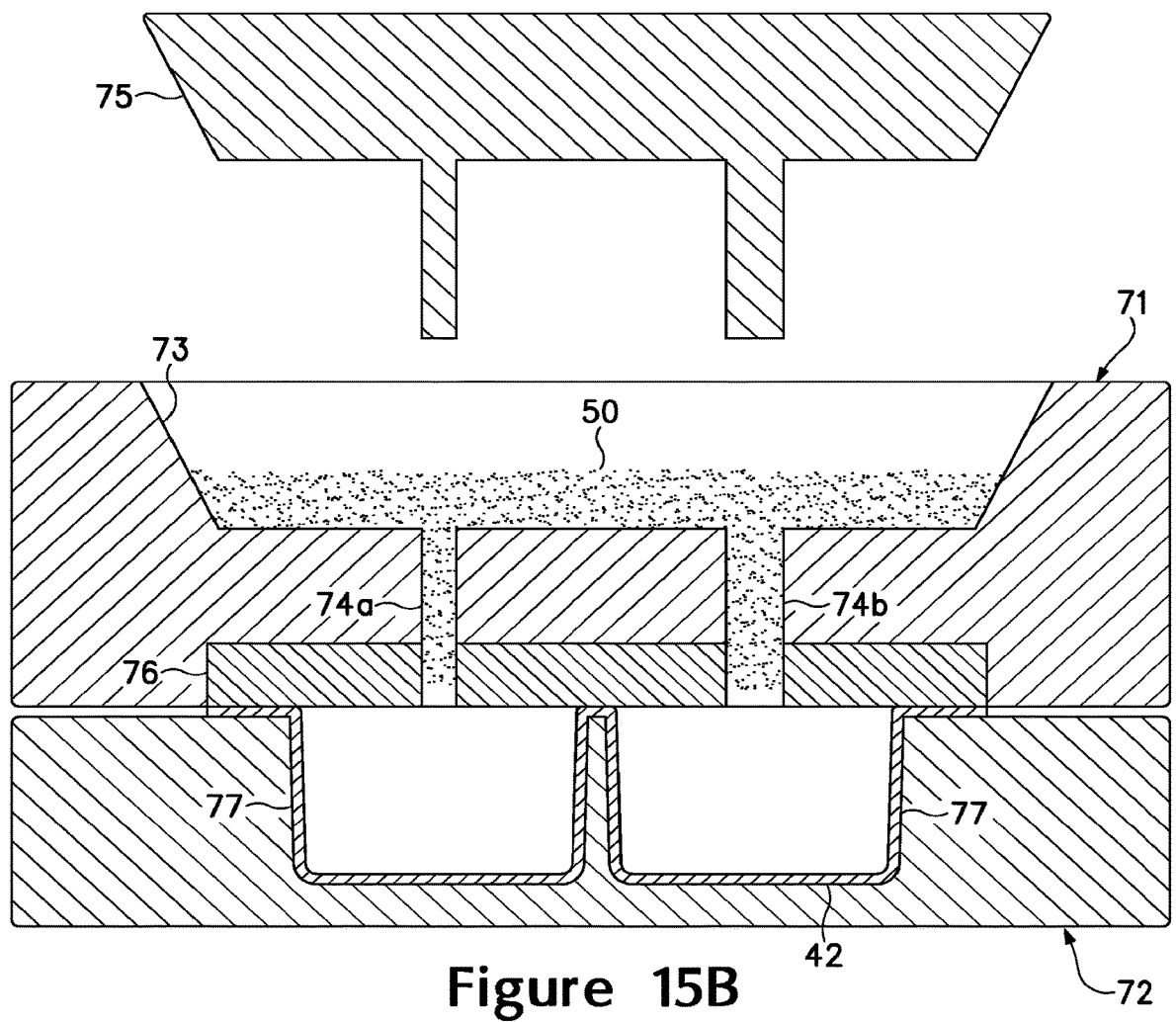
Figure 15C:
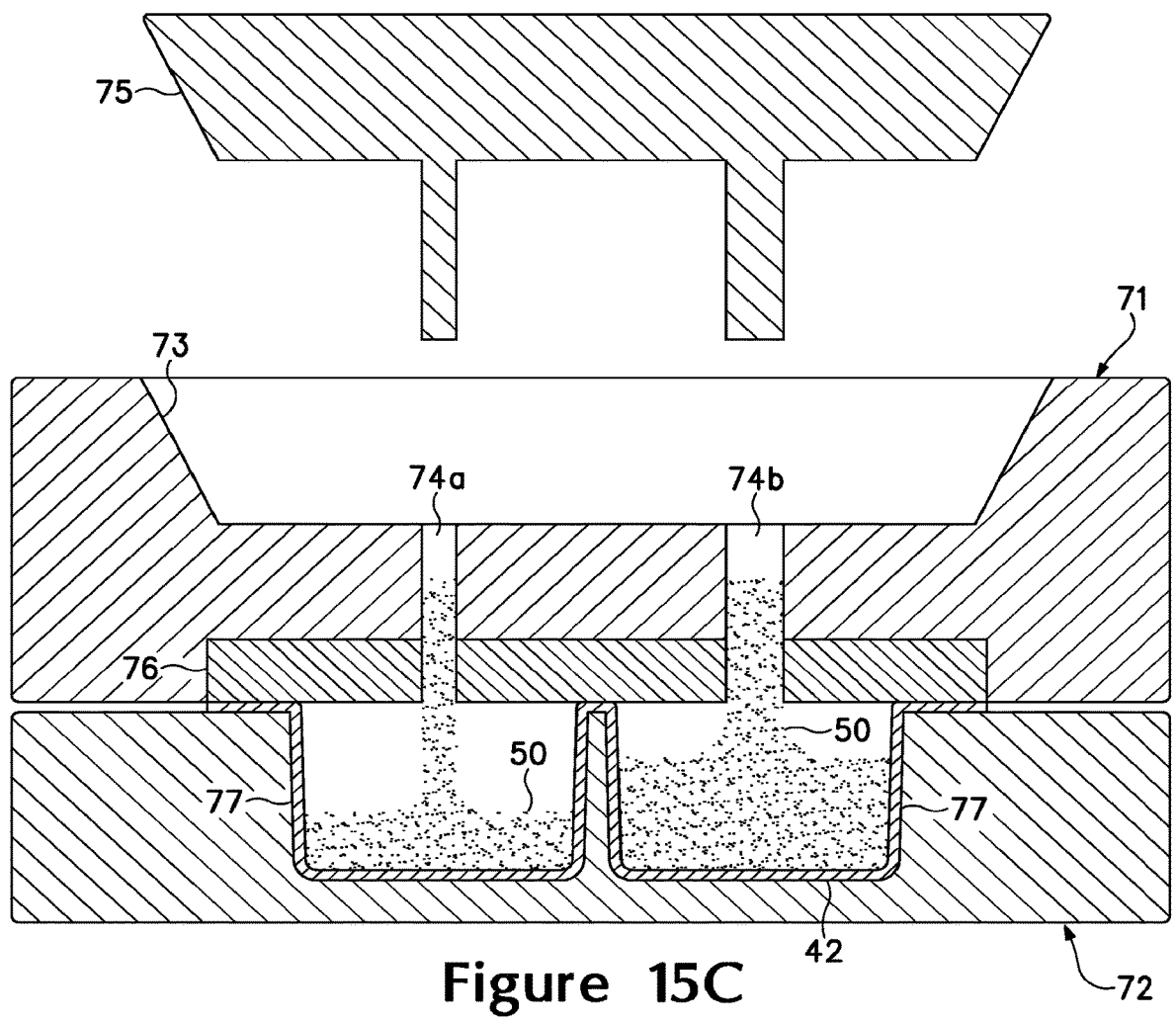

In operation, upper mold portion 71 and lower mold portion 72 are separated so that second layer 42 may be located therebetween, as depicted in FIG. 15A. In addition, sealing lid 75 is removed from a location within depression 73 and outlet conduits 74a and 74b. Once second layer 42 is properly positioned, mold portions 71 and 72 close and a pre-measured quantity of foam material 50 is poured into depression 73, as depicted in FIG. 15B. Foam material 50 then flows due to gravitational forces through outlet conduits 74a and 74b to enter the depressions within second layer 42, as depicted in FIG. 15C. In a manner that is similar to outlet conduits 61a and 61b, outlet conduits 74a and 74b are depicted as having different diameters, with outlet conduit 74a having a lesser diameter than outlet conduit 74b. Due to differences in the diameters of outlet conduits 74a and 74b, the quantity of foam material 50 passing through outlet conduits 74a and 74b and entering the depressions in second layer 42 is different. That is, a greater volume of foam material 50 is expelled from outlet conduit 74b than outlet conduit 74a.

Figure 15D:
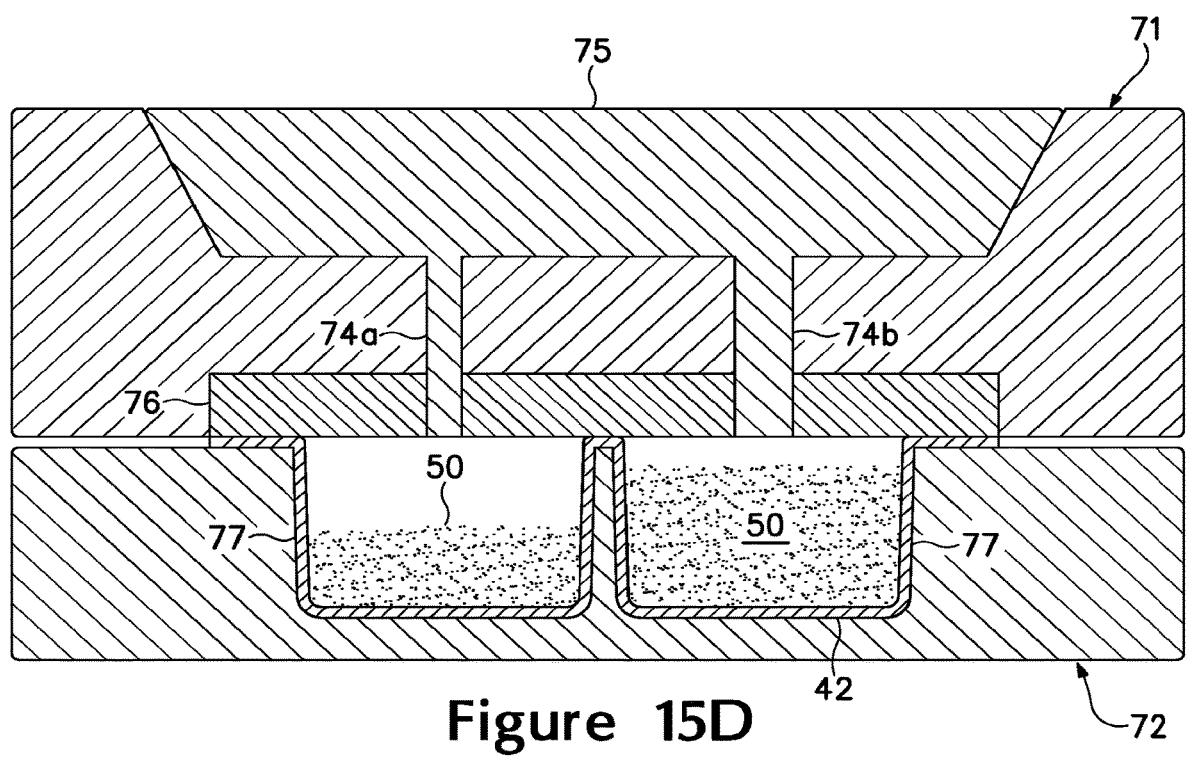
Figure 15E:
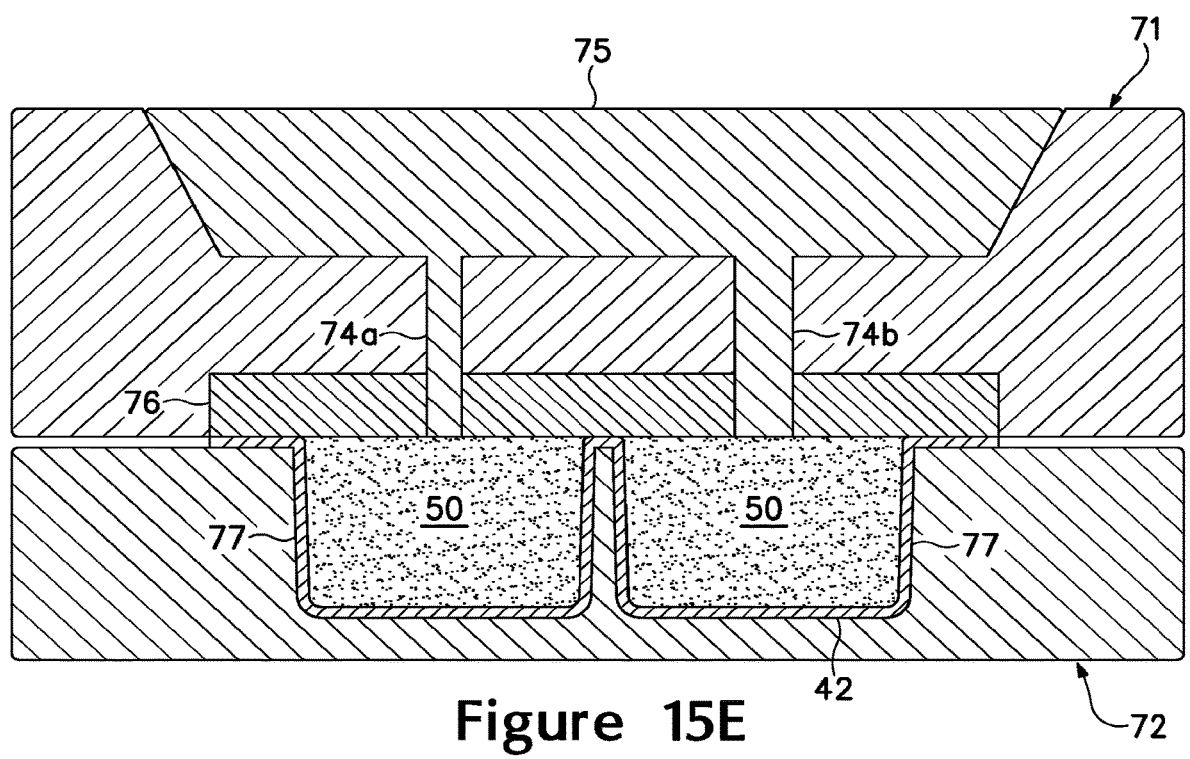

When substantially all of foam material 50 has flowed through outlet conduits 74a and 74b and into the depressions in second layer 42, sealing lid 75 is placed within depression 73 such that protrusions on sealing lid 75 extend into outlet conduits 74a and 74b, as depicted in FIG. 15D, and are flush with a lower surface of permeable block 76. When poured into depression 73, foam material 50 may be in a pre-foamed state that expands after entering the depressions in second layer 42. That is, foam material 50 may include a reactive material that forms gas-filled voids within foam material 50 after entering the depressions in second layer 42. Sealing lid 75 prevents foam material 50 from expanding upward and into outlet conduits 74a and 74b, and permeable block 76 permits gas that is produced from the reaction within foam material 50 to escape the depressions in second layer 42, but effectively blocks foam material 50 from expanding above the depressions in second layer 42. Accordingly, foam material 50 expands to fill the depressions in second layer 42, as depicted in FIG. 15E, but remains within the depressions due to the presence of sealing lid 75 and permeable block 76. As with permeable block 62, permeable block 76 may be formed from a cellular structure metal material. Although not depicted, various channels or conduits may extend through upper mold portion 71 to expel the air or gas that passes through permeable block 76.

Figure 15F:
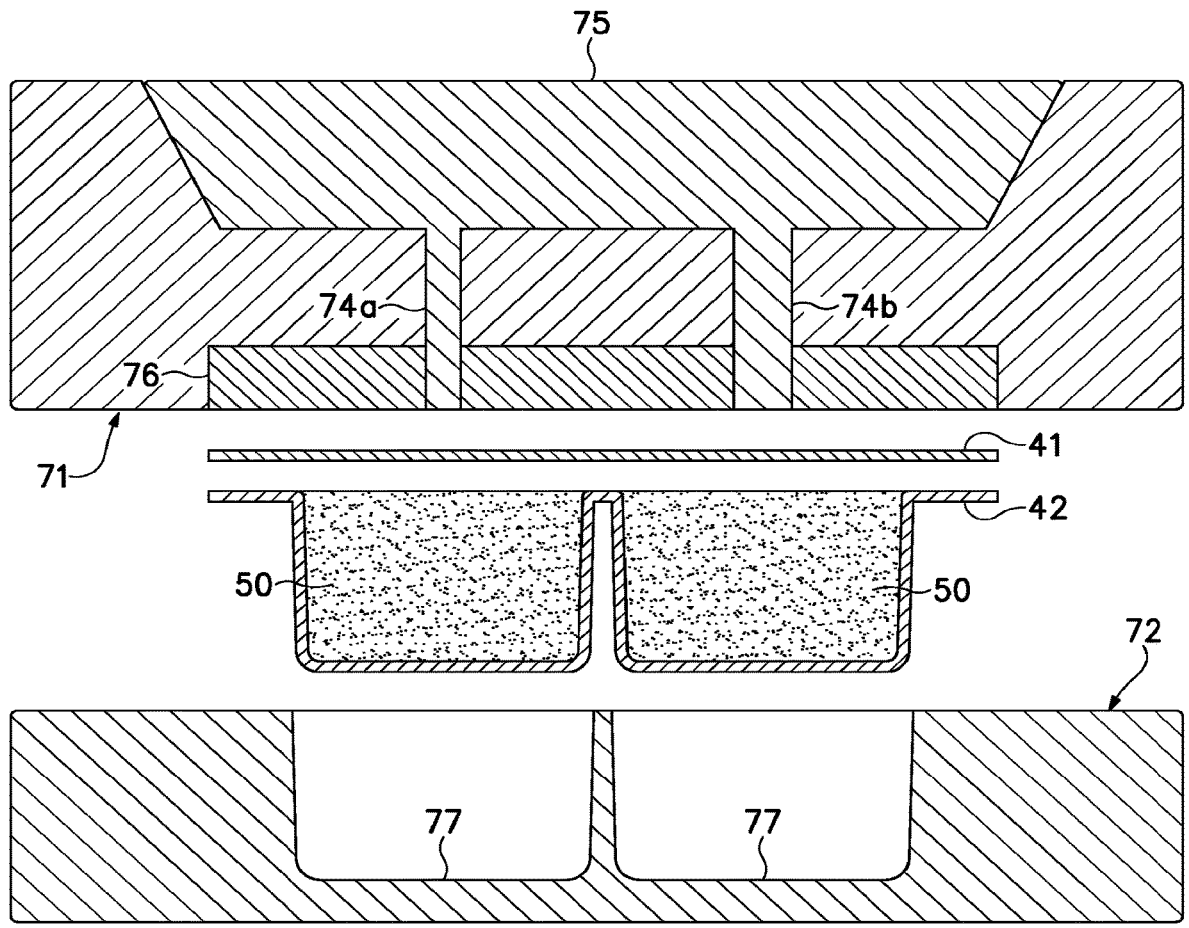
Figure 15G:
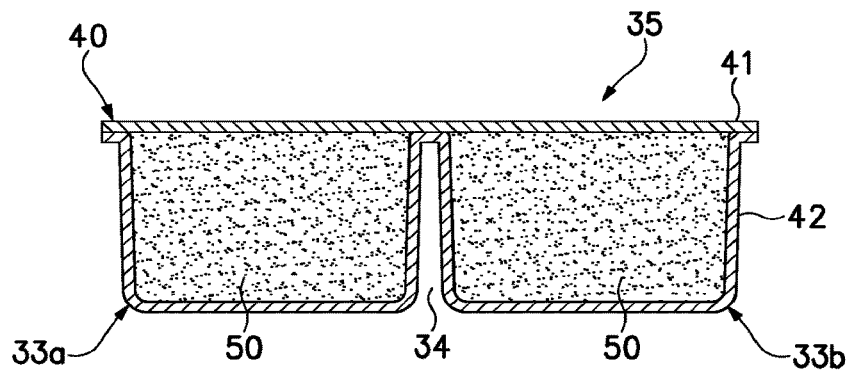
FIG. 15G is a cross-sectional view of the portion of the first sole component, as manufactured by the process depicted in FIGS. 15A-15F.

Following the expansion of foam material 50, second layer 42 and foam material 50 are removed from mold 70 and then first layer 41 is located relative to second layer 42 and foam material 50, as depicted in FIG. 15F. Alternately, second layer 42 and foam material 50 may remain within lower mold portion 72. First layer 41 is then bonded to second layer 42, as depicted in FIG. 15G, to effectively complete the manufacture of portion 35. In some configurations, first layer 41 may also be bonded to an upper surface of foam material 50 when compatible materials are utilized. In order to bond first layer 41 to second layer 42, a bonding apparatus having the features of a bonding apparatus 160, which is discussed below, may be utilized. Although the manufacturing process discussed above with mold 70 is described with reference to portion 35, one skilled in the relevant art will appreciate that concepts associated with the manufacturing process of portion 35 may be applied to the entirety of sole component 31. That is, the general process discussed above may be utilized to form the entirety of sole component 31. In further processes, different foam materials may be located within each of support elements 33a and 33b, or foam material 50 may be poured or otherwise located within support elements 33a and 33b at different times, rather than simultaneously.

As discussed above, different quantities of foam material 50 entered the depressions in second layer 42 due to differences in outlet conduits 74a and 74b. The different quantities have an effect upon the resulting densities of foam material 50 within each of support elements 33a and 33b. More particularly, support element 33a received a lesser quantity of foam material than support element 33b, and the density of foam material 50 within support element 33a is less than the density of foam material 50 within support element 33b. By varying the supply of foam material 50, therefore, the density within the support elements 33a and 33b also varies.

Further Configurations

Figure 16A:
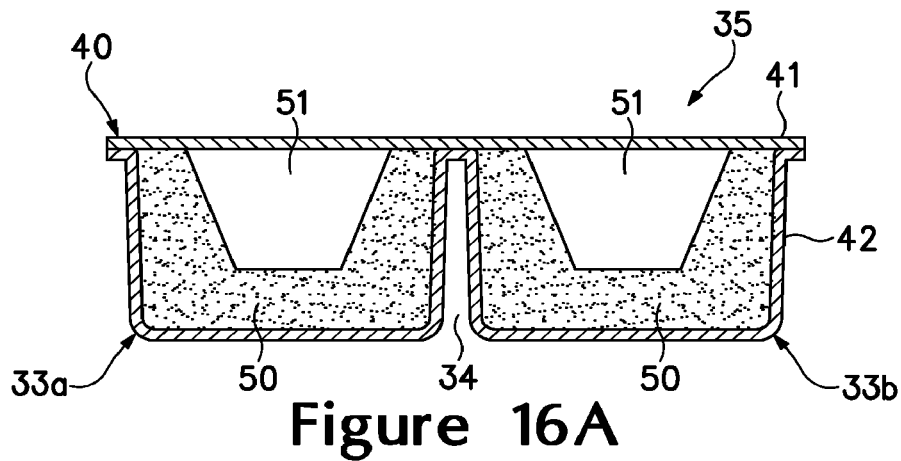
FIGS. 16A-16E are cross-sectional views that correspond with FIG. 9 and depict alternate configurations of the portion of the first sole component.
Figure 16B:
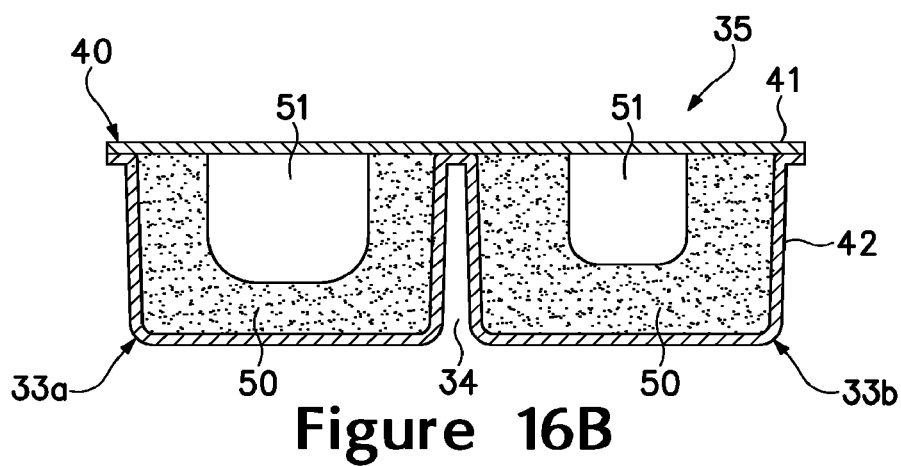
Figure 16C:
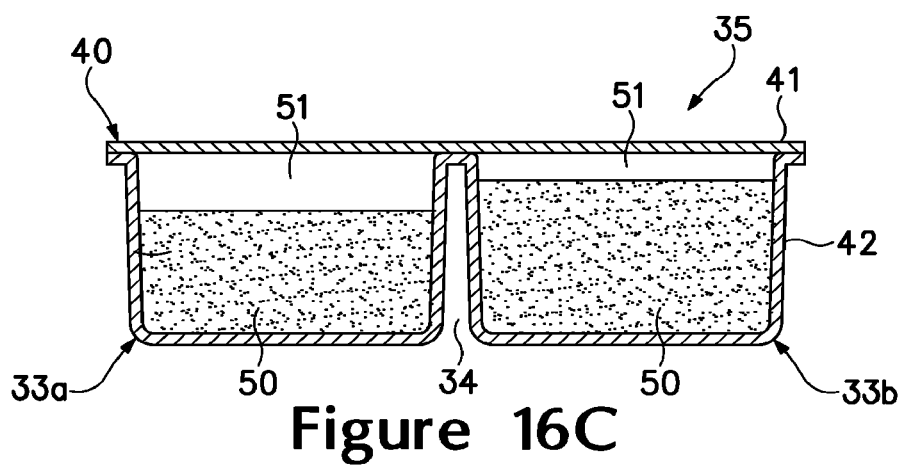

In each of the configurations discussed above, foam material 50 entirely fills the various support elements 33. With reference to FIGS. 16A-16C, cross-sectional views of portion 35 depict configurations wherein fluid-filled or air-filled cavities 51 are formed in foam material 50. More particularly, FIG. 16A depicts a configuration wherein foam material 50 forms trapezoidal-shaped cavities 51, and FIG. 16B depicts a configuration wherein foam material 50 forms rounded or generally semicircular-shaped cavities 51. In contrast with FIG. 16A, cavities 51 in FIG. 16B exhibit different sizes. As with the technique of pouring different quantities of foam material 50 into support elements 33a and 33b, forming cavities 51 to have different sizes also has an effect upon the relative compressibilities of support elements 33a and 33b. As depicted in FIG. 16C, cavities 51 may also be fluid gaps between an upper surface of foam material 50 and first layer 41. Although cavities 51 are depicted as being adjacent to shell 40, cavities 51 may be located in a center of foam material 50 in some configurations of sole component 31. In addition, the gas within cavities 51 may be pressurized or unpressurized relative to the exterior of footwear 10.

Figure 17:
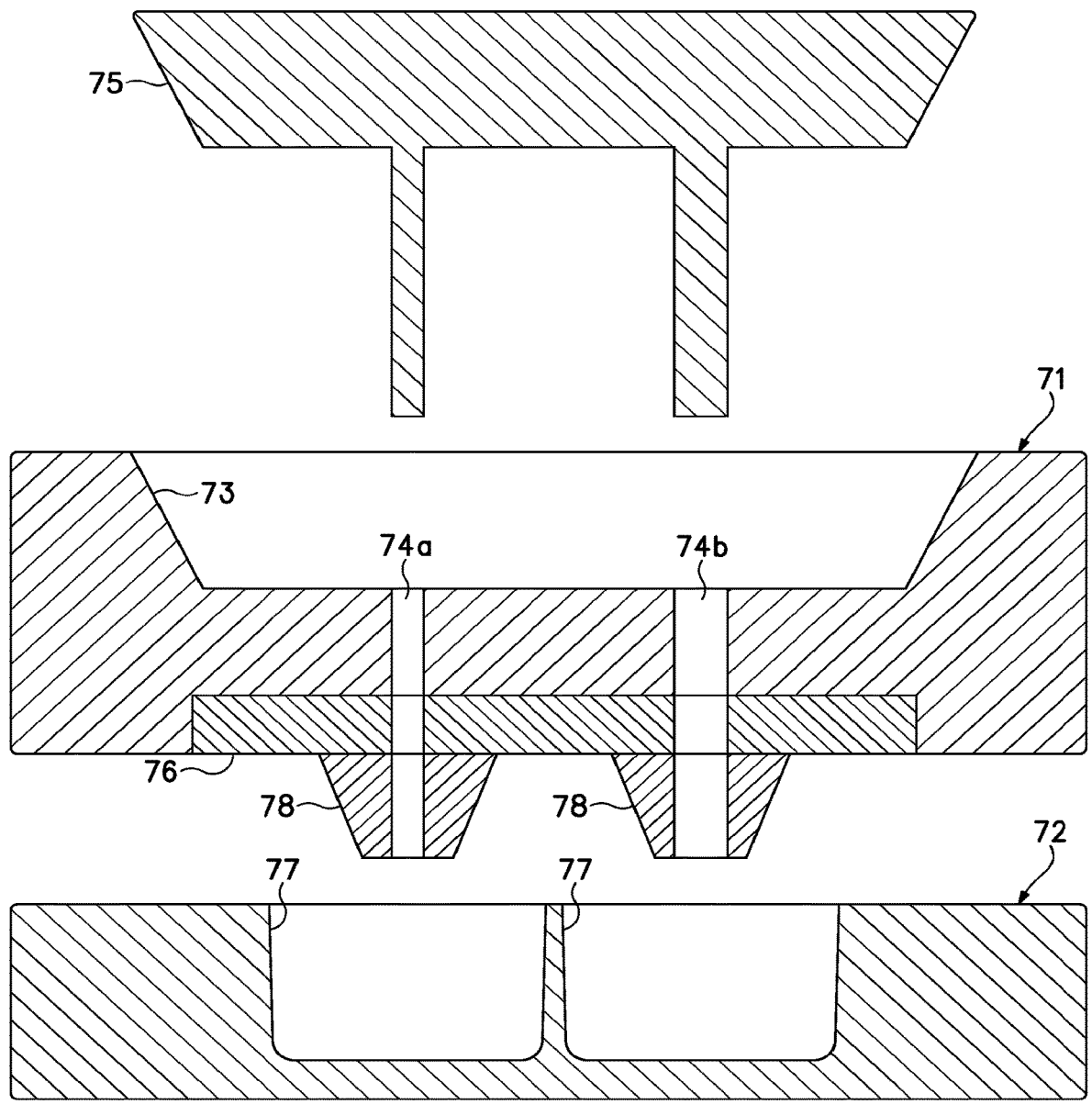
FIG. 17 is a cross-sectional view corresponding with FIG. 14 and depicting another configuration of the apparatus.
Figure 18:
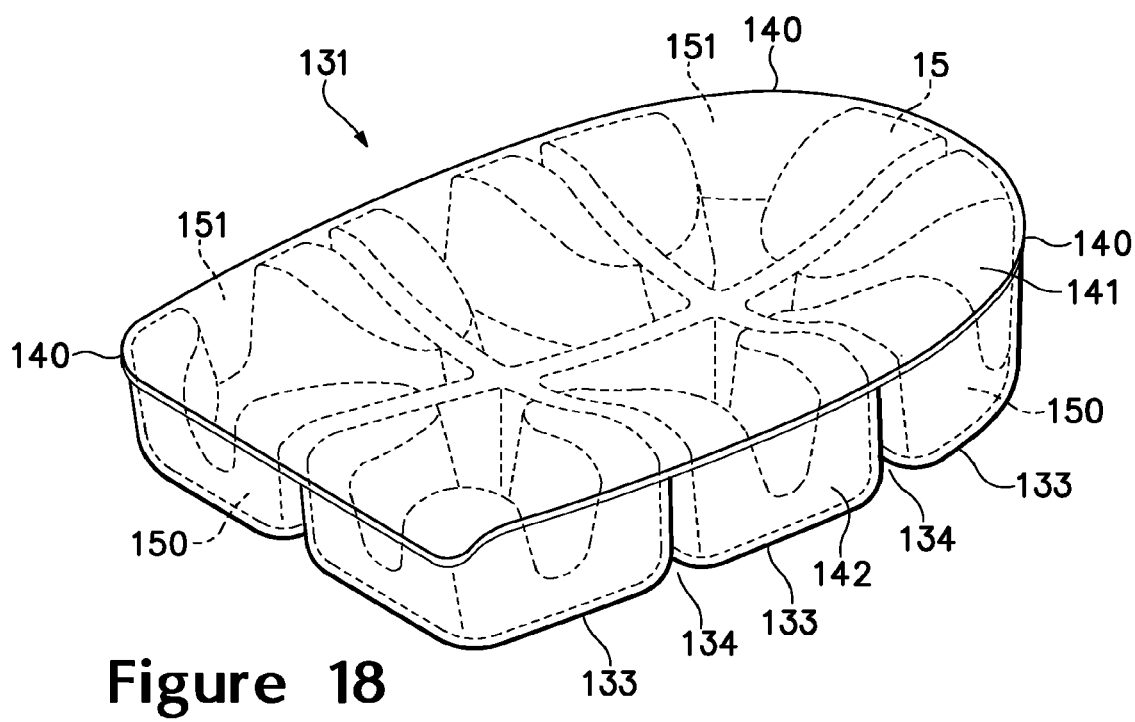
FIG. 18 is a perspective view of a second sole component.
Figure 19:
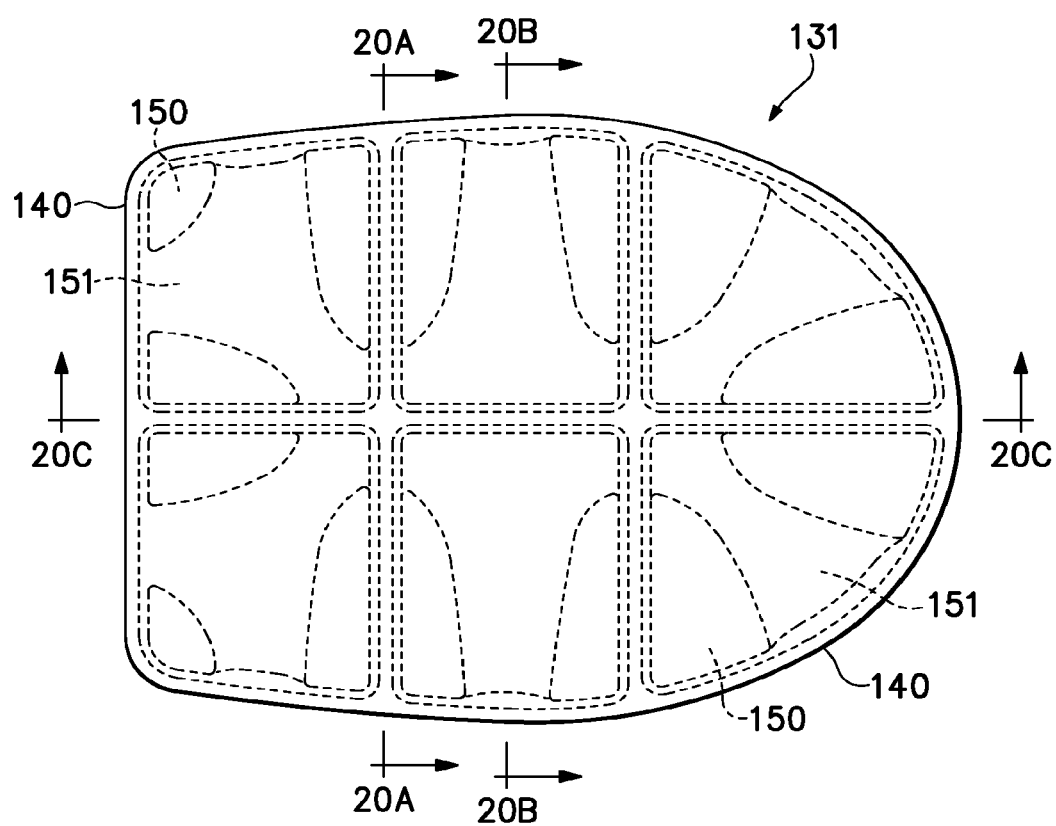
FIG. 19 is a top plan view of the second sole component.
Figure 20A:
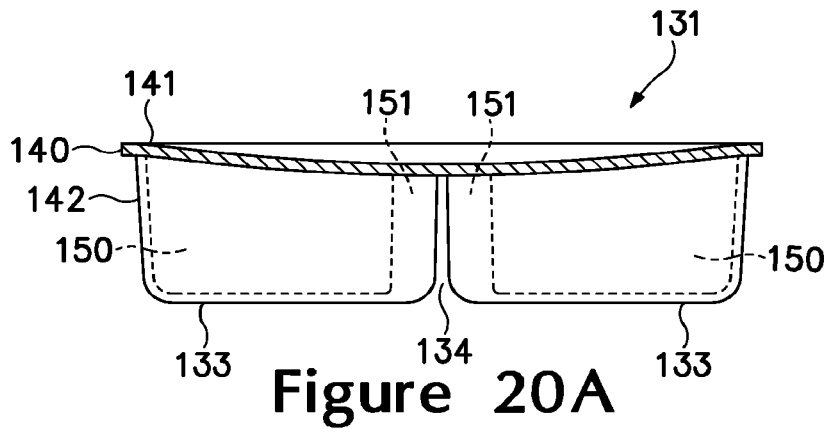
FIGS. 20A-20C are cross-sectional views of the second sole component, as defined by section lines 20A-20C in FIG. 19.
Figure 20B:
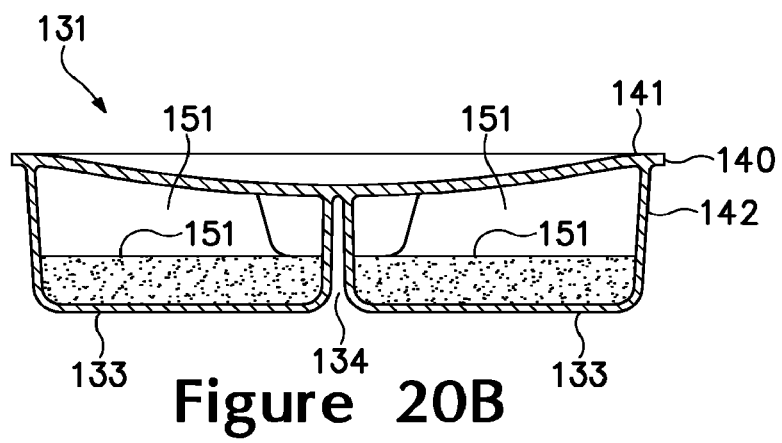
Figure 20C:
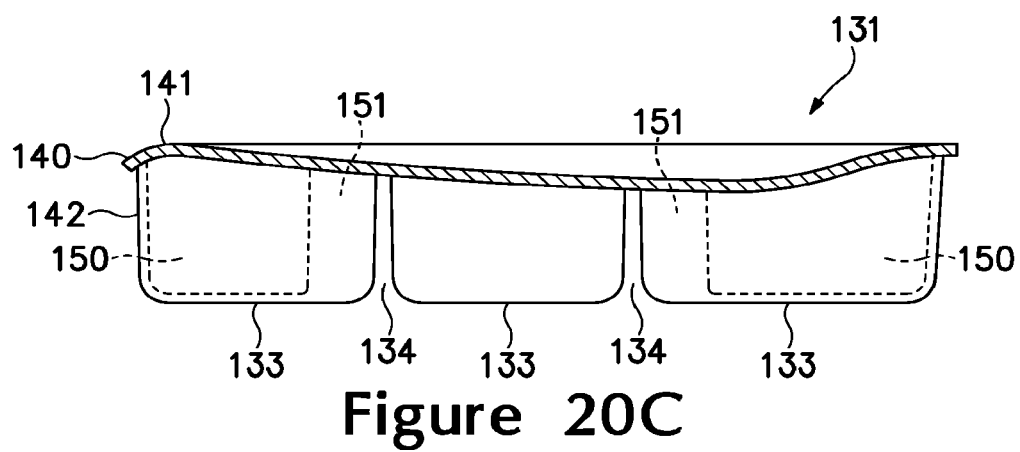
Figure 21:
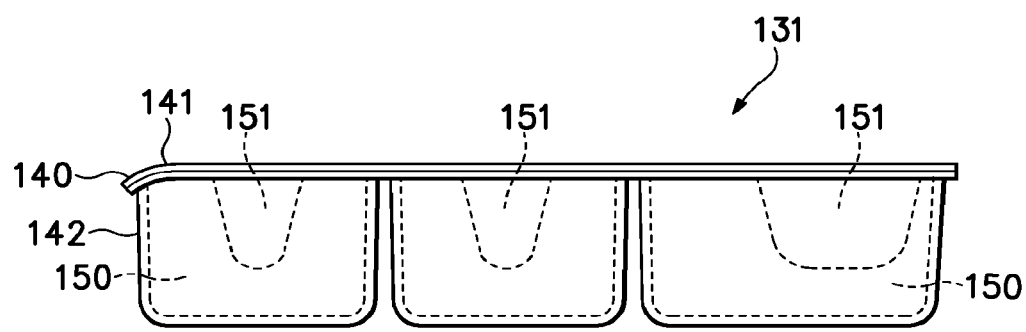
FIG. 21 is a side elevational view of the second sole component.
Figure 22:
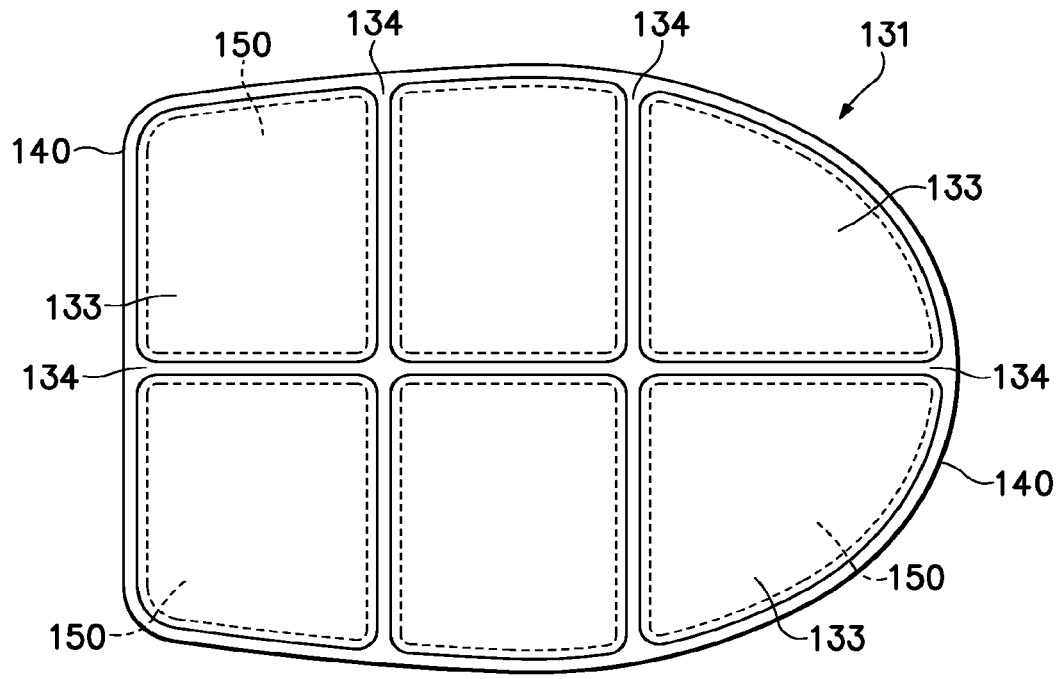
FIG. 22 is a bottom plan view of the second sole component.

In manufacturing portion 35 to include cavities 51, mold 70 may be modified to incorporate protrusions 78, as depicted in FIG. 17. Protrusions 78 extend into the depressions in second layer 42 during the manufacturing process of portion 35. During expansion, foam material 50 extends around protrusions 78 to form cavities 51 with the shape of protrusions 78. Protrusions 78 are depicted as having a generally trapezoidal shape and form, therefore, the configuration of cavities 51 depicted in FIG. 16A. In other configurations, protrusions 78 may have rounded configurations or any other configuration to form cavities 51 to exhibit other shapes. Protrusions 78 may be formed from a cellular structure metal material or a variety of other materials.

Figure 16D:
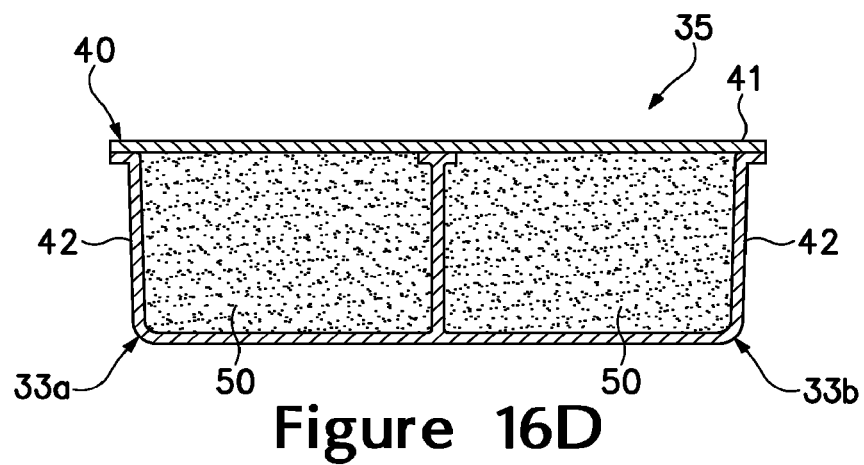
Figure 16E:
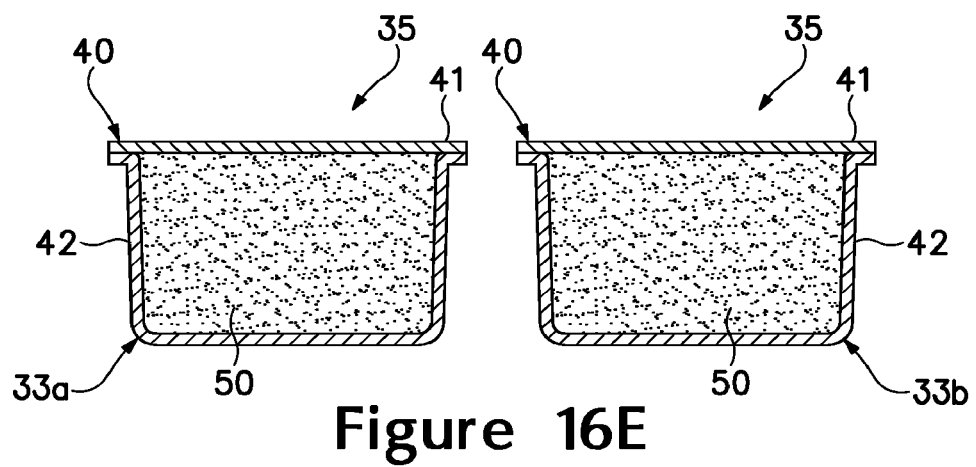

In the various configurations discussed above, one of flexion indentations 34 is depicted as extending between support elements 33a and 33b. More particularly, a variety of flexion indentations 34 are depicted as extending between the various support elements 33. In further configurations, support elements 33a and 33b may be joined such that flexion indentation 34 is absent, as depicted in FIG. 16D. In other configurations, support elements 33a and 33b may also be separate portions of sole structure 30, as depicted in FIG. 16E.

Sole component 31 is depicted as extending throughout a length and a width of footwear 10. In some configurations, a similar sole component may be limited to particular areas of sole structure 30. For example, a sole component may be located within only heel region 13 or forefoot region 11, for example. Alternately, a sole component may only be located adjacent lateral side 14. Accordingly, the manner in which sole component 31 or similar structures are utilized within an article of footwear may vary significantly.

Referring to FIGS. 18-22, another sole component 131 is depicted as including outer shell 140 and a compressible foam material 150 located within shell 140. Whereas sole component 31 has a configuration that extends along substantially all of the length of footwear 10, sole component 131 has a configuration that may be primarily located in a heel region of an article of footwear. Foam elements or other sole elements may, therefore, form the midfoot and forefoot portions of a sole structure incorporating sole component 131.

An upper portion of shell 140 is formed from a first layer 141 of a polymer material, and a lower portion of shell 140 is formed from a second layer 142 of the polymer material. Each of layers 141 and 142 exhibit a contoured configuration. More particularly, first layer 141 is contoured to form a central depression, and second layer 142 is contoured to define six support elements 133 and various flexion indentations 134 that extend between support elements 133. As with sole component 30, support elements 133 may be discrete portions of sole component 131 that extend downward from a footwear upper. In the configurations of portion 35 depicted in FIGS. 16A-16C, foam material 50 formed various cavities 51 that provided an air or gas space within support elements 33a and 33b. Foam material 150 also defines various cavities 151 that define air or gas spaces within support elements 133.

In order to form cavities 151, protrusions similar to protrusions 78 may be incorporated into a mold that pours foam material 150 into the depressions formed by second layer 142. Once the foam has expanded, the mold may be opened to such that second layer 142 and foam material 150 may be removed. A bonding apparatus 160, which is depicted in FIGS. 23A and 23B, may then be utilized to join first layer 141 to second layer 142 or to join first layer 141 to second layer 142 and an upper surface of foam material 150.

Bonding apparatus 160 includes an upper bonding portion 161 and a lower bonding portion 162. Bonding portion 161 has a contoured area that corresponds with the shape of first layer 141. More particularly, upper bonding portion 161 has an area with a shape that corresponds with the shape of the upper surface of sole component 131. Similarly, lower bonding portion 162 has a contoured area that corresponds with the shape second layer 142. More particularly, lower bonding portion 162 has an area with a shape that corresponds with the shape of the lower surface of sole component 131 and extends into the various flexion indentations 134.

Figure 24A:
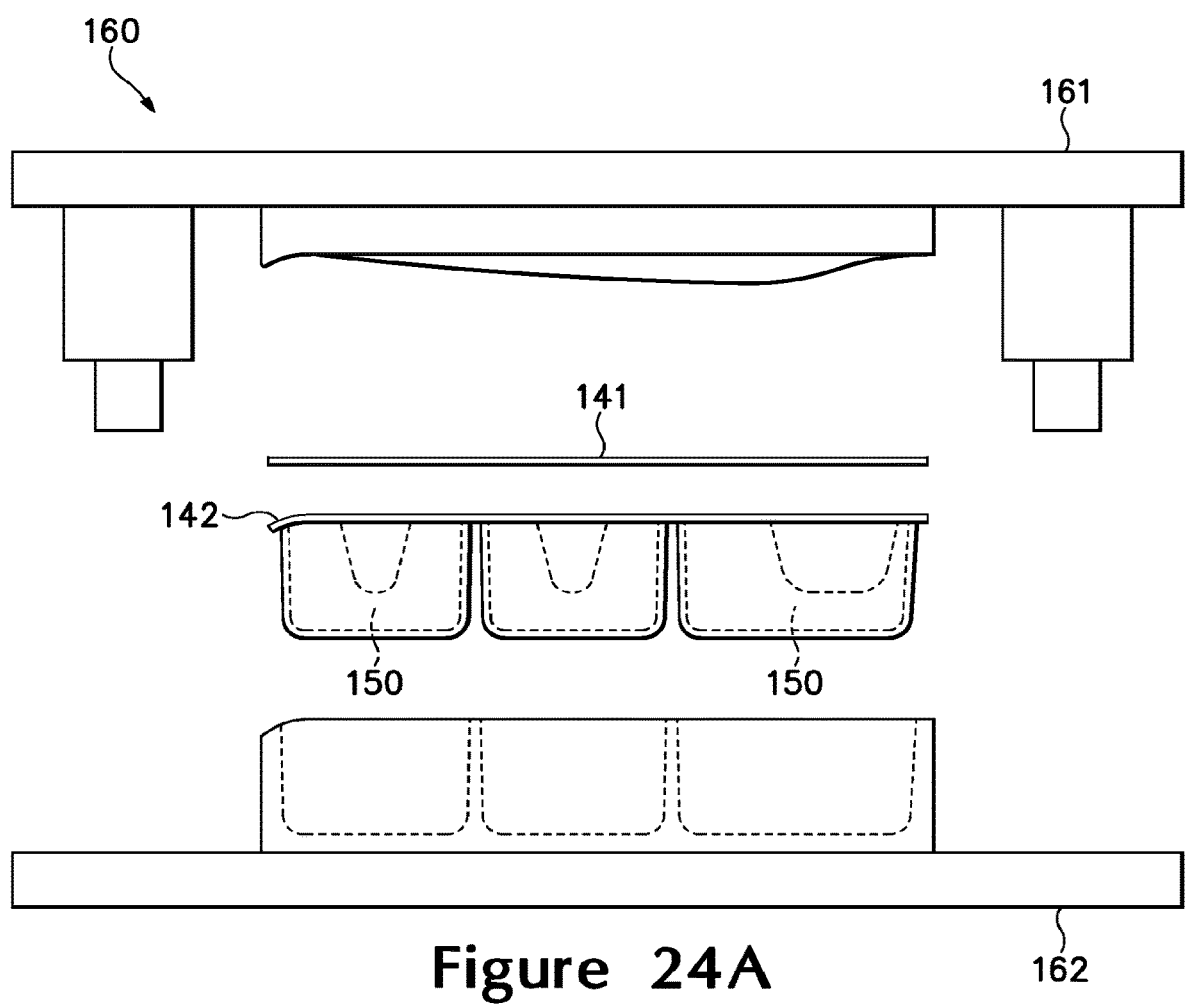
FIGS. 24A-24C are side elevational views of the bonding apparatus and depict a portion of a manufacturing process for forming the second sole component.
Figure 24B:
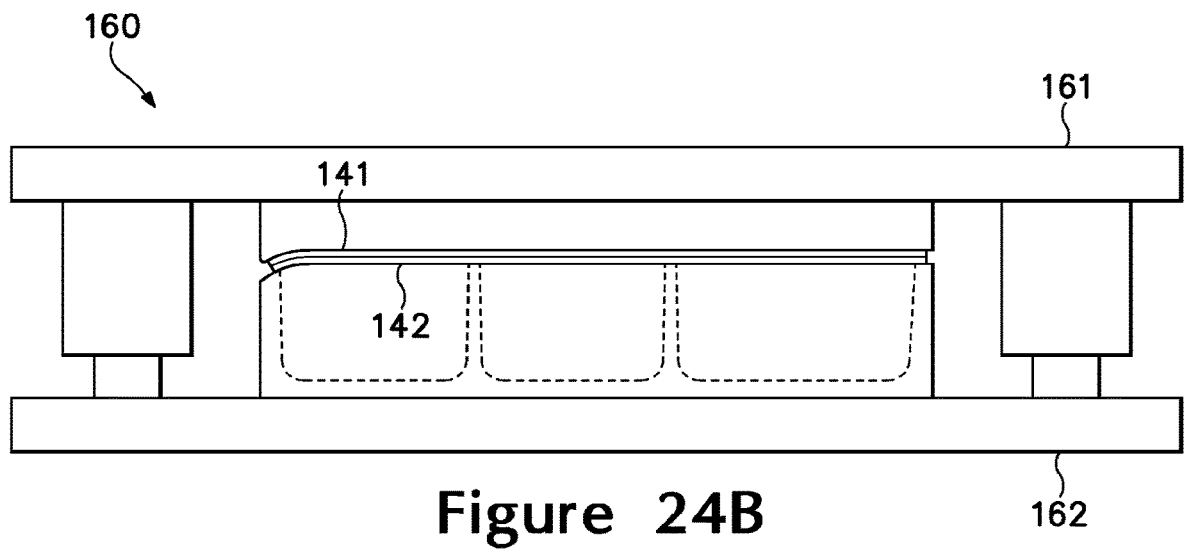
Figure 24C:
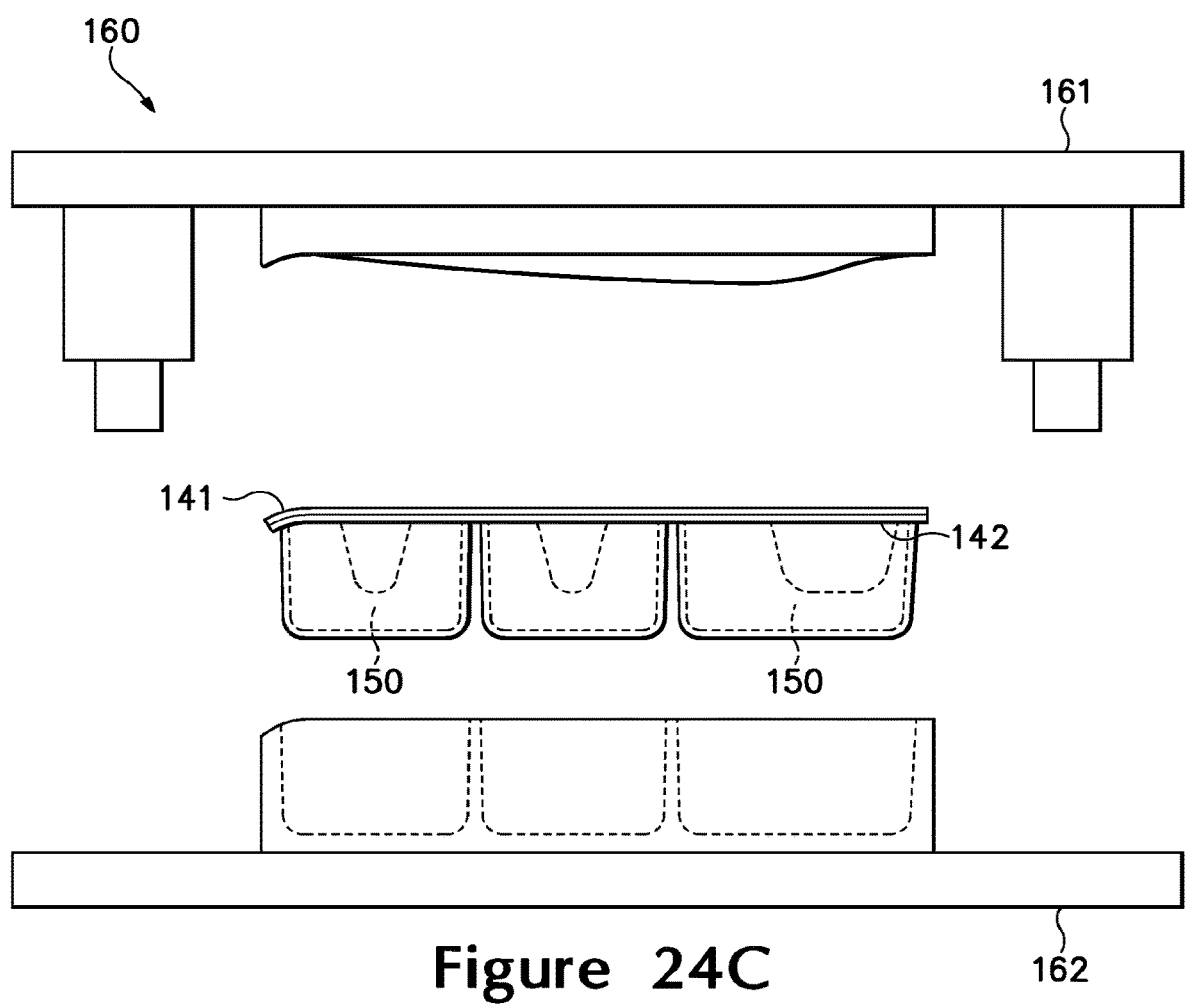

In order to bond first layer 141 to second layer 142, first layer 141 and the combination of second layer 142 and foam material 150 are located between upper bonding portion 161 and lower bonding portion 162, as depicted in FIG. 24A. Bonding portions 161 and 162 then translate toward each other to compress layers 141 and 142 together, as depicted in FIG. 24B. At this point, heat or radio frequency (RF) energy may be utilized to elevate the temperature of layers 141 and 142, thereby bonding or otherwise securing the layers together. Bonding portions 161 and 162 then separate to permit removal of the completed sole component 131.

In contrast with many radio frequency welding apparatuses for footwear applications, bonding apparatus 160 has contoured interfaces. As discussed above, first layer 141 is contoured to form a central depression. The bond that joins layers 141 and 142 follows, therefore, the contours of the central depression. Similarly, the areas of bonding portions 161 and 162 that form the bonds between layers 141 and 142 are also contoured to form the non-planar bond.

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

What is claimed is:

1. A method of manufacturing a sole structure for an article of footwear, the method comprising:
   forming a shell including a first support element defining a first void and a second support element defining a second void, wherein forming the shell includes forming a lower portion of the shell of a first barrier layer defining the first void and the second void;
   dispensing a first volume of a foam material in the first void;
   dispensing a second volume of the foam material in the second void, the second volume greater than the first volume;
   forming a first cavity in the first volume of the foam material;
   forming a second cavity in the second volume of the foam material; and
   sealing the first cavity and the second cavity, wherein sealing the first cavity and the second cavity includes joining a second barrier layer to the first barrier layer to seal the first support element and the second support element, the first cavity and the second cavity being entirely filled with gas after sealing.

2. The method of claim 1, wherein forming the first cavity and the second cavity includes forming the first cavity with a greater volume than the second cavity.

3. The method of claim 2, wherein filling the first cavity and the second cavity with gas includes filling the first cavity and the second cavity with air.

4. The method of claim 1, further comprising forming a flexion indentation between the first support element and the second support element.

5. The method of claim 1, wherein forming the shell further includes fluidly isolating the first void from the second void.

6. The method of claim 1, wherein forming the shell includes forming the first support element in a heel region of the sole structure and forming the second support element in one of a midfoot region of the sole structure and a forefoot region of the sole structure.

7. The method of claim 1, wherein forming the shell includes forming the shell of a polymer material.

* * * * *